US011961359B2

(12) United States Patent
Jain et al.

(10) Patent No.: US 11,961,359 B2
(45) **Date of Patent: *Apr. 16, 2024**

(54) ELECTRONIC GAMING MACHINE AND METHOD FOR PROVIDING HOTSPOT FUNCTIONALITY TO GUI

(71) Applicant: Aristocrat Technologies Australia Pty Limited, North Ryde (AU)

(72) Inventors: Sanchit Jain, New Dehli (IN); Jason Meyer, Wyoming (AU)

(73) Assignee: Aristocrat Technologies Australia Pty Ltd., North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,499

(22) Filed: Apr. 7, 2023

(65) Prior Publication Data

US 2023/0245522 A1 Aug. 3, 2023

Related U.S. Application Data

(63) Continuation of application No. 16/950,000, filed on Nov. 23, 2020, now Pat. No. 11,625,975.

(30) Foreign Application Priority Data

Nov. 29, 2019 (AU) ................................ 2019904507
Sep. 24, 2020 (AU) ................................ 2020239714

(51) Int. Cl.
*G07F 17/32* (2006.01)

(52) U.S. Cl.
CPC ...... *G07F 17/3213* (2013.01); *G07F 17/3244* (2013.01); *G07F 17/3267* (2013.01)

(58) Field of Classification Search
CPC ............. G07F 17/3209; G07F 17/3213; G07F 17/3244; G07F 17/326; G07F 17/3267; G07F 17/34; G06F 7/588
See application file for complete search history.

(56) References Cited

U.S. PATENT DOCUMENTS 5,833,537 A 11/1998 Barrie
5,935,002 A 8/1999 Falciglia
(Continued)

FOREIGN PATENT DOCUMENTS

AU 2019204175 2/2020

OTHER PUBLICATIONS

Notice of Allowance dated Oct. 27, 2021 for U.S. Appl. No. 16/948,606 (pp. 1-8).

(Continued)

*Primary Examiner* — Justin L Myhr
(74) *Attorney, Agent, or Firm* — Weaver Austin Villeneuve & Sampson LLP

(57) ABSTRACT

Methods and apparatuses are provided for providing reel-strip-based wagering games in which the reel strips include one or more feature symbols and one or more configurable symbols. Each time a feature symbol of a reel strip is displayed in a window of the wagering game associated with that reel strip, one or more "hot spot windows" associated with that window may be determined. Hot spot windows may have a modified status applied to them that may last for a predetermined number of gameplay instances. Awards associated with the configurable symbols may, if a configurable symbol is selected for display in a window with one or more modified statuses currently applied, be modified by a modifier that is based on the applied one or more modified statuses.

20 Claims, 15 Drawing Sheets

(56) References Cited

U.S. PATENT DOCUMENTS

| | | | |
|---|---|---|---|
| 6,186,894 | B1 | 2/2001 | Mayeroff |
| 7,237,775 | B2 | 7/2007 | Thomas |
| 7,445,547 | B2 | 11/2008 | Suzuki |
| 7,780,519 | B2 | 8/2010 | Gomez |
| 8,172,665 | B2 | 5/2012 | Hoffman |
| 8,226,468 | B2 | 7/2012 | Hoffman |
| 8,371,928 | B2 | 2/2013 | Englman |
| 8,388,438 | B2 | 3/2013 | Englman |
| 8,460,092 | B1 | 6/2013 | Slomiany |
| 8,591,308 | B2 | 11/2013 | Hoffman |
| 9,135,785 | B2 | 9/2015 | Hoffman |
| 9,449,470 | B2 | 9/2016 | Baerlocher |
| 9,530,287 | B2 | 12/2016 | Hoffman |
| 9,564,006 | B2 | 2/2017 | Ryan |
| 9,600,979 | B2 | 3/2017 | Hornik |
| 9,640,025 | B2 | 5/2017 | Saunders |
| 9,691,231 | B2 | 6/2017 | Fujisawa |
| 9,824,527 | B2 | 11/2017 | Evans |
| 9,836,915 | B2 | 12/2017 | Meyer |
| 9,940,775 | B2 | 4/2018 | Eaton |
| 10,152,845 | B2 | 12/2018 | Pawloski |
| 10,388,112 | B2 | 8/2019 | You |
| 10,403,093 | B1 | 9/2019 | Halvorson |
| 10,410,477 | B2 | 9/2019 | Hoffman |
| 2003/0022712 | A1 | 1/2003 | Locke |
| 2003/0092487 | A1 | 5/2003 | Meyer |
| 2004/0033827 | A1 | 2/2004 | Gilmore |
| 2004/0048646 | A1 | 3/2004 | Martin |
| 2004/0053676 | A1 | 3/2004 | Rodgers |
| 2005/0059459 | A1 | 3/2005 | Dunn |
| 2006/0189380 | A1 | 8/2006 | Schultz |
| 2007/0026923 | A1 | 2/2007 | Muir |
| 2007/0060265 | A1 | 3/2007 | Marks |
| 2007/0238510 | A1 | 10/2007 | Halprin |
| 2008/0242404 | A1 | 10/2008 | Aoki |
| 2009/0325681 | A1 | 12/2009 | Englman |
| 2010/0298041 | A1 | 11/2010 | Berman |
| 2011/0045894 | A1 | 2/2011 | Owen |
| 2011/0124405 | A1 | 5/2011 | Okada |
| 2012/0202570 | A1 | 8/2012 | Schwartz |
| 2014/0274284 | A1 | 9/2014 | Leupp |
| 2015/0018070 | A1 | 1/2015 | Meyer |
| 2015/0024826 | A1 | 1/2015 | Ghaly |
| 2015/0087382 | A1 | 3/2015 | Gilbertson |
| 2015/0087385 | A1 | 3/2015 | Shiraishi |
| 2015/0094132 | A1 | 4/2015 | Elias |
| 2015/0213672 | A1 | 7/2015 | Elias |
| 2015/0339889 | A1 | 11/2015 | Oropeza |
| 2015/0363999 | A1 | 12/2015 | Little |
| 2016/0093150 | A1 | 3/2016 | Penacho |
| 2016/0203670 | A1 | 7/2016 | Ford |
| 2016/0247361 | A1 | 8/2016 | Meyer |
| 2017/0011582 | A1 | 1/2017 | Fong |
| 2018/0025585 | A1 | 1/2018 | Schmidt |
| 2018/0061176 | A1 | 3/2018 | Berman |
| 2018/0130286 | A1 | 5/2018 | Berman |
| 2018/0268659 | A1 | 9/2018 | Chesworth |
| 2019/0139371 | A1 | 5/2019 | Lamb |
| 2019/0206191 | A1 | 7/2019 | Halvorson |
| 2019/0287336 | A1 | 9/2019 | Prabhu |
| 2019/0304255 | A1 | 10/2019 | San |
| 2020/0051373 | A1 | 2/2020 | Meyer |
| 2020/0111291 | A1 | 4/2020 | Pariseau |
| 2020/0168053 | A1 | 5/2020 | Berman |

OTHER PUBLICATIONS

Aristocrat, Welcome to Fantastic Jackpots—Fantastic Cash, https://www.aristocrat.com/anz/games/welcome-to-fantastic-jackpots-fantastic-cash/, Aug. 2018.

Notice of Allowance dated Apr. 5, 2021 for U.S. Appl. No. 16/538,623 (pp. 1-9).

Notice of Allowance dated Aug. 31, 2021 for U.S. Appl. No. 16/948,606 (pp. 1-9).

Office Action dated Sep. 13, 2021 for U.S. Appl. No. 16/948,607 (pp. 1-16).

Office Action (Non-Final Rejection) dated Dec. 22, 2021 for U.S. Appl. No. 16/950,000 (pp. 1-16).

Notice of Allowance dated Feb. 9, 2022 for U.S. Appl. No. 16/948,606 (pp. 1-2).

Notice of Allowance dated Feb. 23, 2022 for U.S. Appl. No. 16/948,607 (pp. 1-9).

Office Action (Final Rejection) dated Jul. 5, 2022 for U.S. Appl. No. 16/950,000 (pp. 1-15).

Office Action dated Aug. 12, 2021 for U.S. Appl. No. 16/948,308 (pp. 1-17).

Office Action dated Jan. 13, 2022 for U.S. Appl. No. 16/948,308 (pp. 1-6).

Office Action (Non-Final Rejection) dated Mar. 24, 2022 for U.S. Appl. No. 16/948,309 (pp. 1-24).

Office Action (Notice of Allowance and Fees Due (PTOL-85)) dated Jun. 7, 2022 for U.S. Appl. No. 16/948,308 (pp. 1-8).

Office Action (Notice of Allowance and Fees Due (PTOL-85)) dated Sep. 27, 2022 for U.S. Appl. No. 16/948,308 (pp. 1-8).

Office Action (Notice of Allowance and Fees Due (PTOL-85)) dated Nov. 3, 2022 for U.S. Appl. No. 17/366,307 (pp. 1-5).

Office Action (Final Rejection) dated Oct. 26, 2022 for U.S. Appl. No. 16/948,309 (pp. 1-23).

Office Action (Notice of Allowance and Fees Due (PTOL-85)) dated Nov. 10, 2022 for U.S. Appl. No. 17/366,307 (pp. 1-2).

Office Action (Notice of Allowance and Fees Due (PTOL-85)) dated Dec. 14, 2022 for U.S. Appl. No. 16/950,000 (pp. 1-8).

Office Action (Notice of Allowance and Fees Due (PTOL-85)) dated Feb. 1, 2023 for U.S. Appl. No. 16/948,308 (pp. 1-8).

Office Action (Notice of Allowance and Fees Due (PTOL-85)) dated Feb. 8, 2023 for U.S. Appl. No. 16/948,309 (pp. 1-9).

Office Action (Notice of Allowance and Fees Due (PTOL-85)) dated Mar. 16, 2023 for U.S. Appl. No. 16/948,309 (pp. 1-2).

Office Action (Non-Final Rejection) dated Mar. 27, 2023 for U.S. Appl. No. 17/650,202 (pp. 1-8).

Office Action (Notice of Allowance and Fees Due (PTOL-85)) dated May 11, 2023 for U.S. Appl. No. 16/948,308 (pp. 1-2).

Office Action (Notice of Allowance and Fees Due (PTOL-85)) dated Jul. 10, 2023 for U.S. Appl. No. 17/650,202 (pp. 1-8).

Office Action (Notice of Allowance and Fees Due (PTOL-85)) dated Oct. 18, 2023 for U.S. Appl. No. 17/650,202 (pp. 1-2).

300

| | Reel strip position | Reel 1 (341) | Reel 2 (342) | Reel 3 (343) | Reel 4 (344) | Reel 5 (345) |
|---|---|---|---|---|---|---|
| 301 | 1 | Pic 1 | 10 | Pic 3 | Q | Pic 1 |
| 302 | 2 | K | Q | K | A | 10 |
| 303 | 3 | J | K | 10 | 10 | A |
| 304 | 4 | Scat | Pic 1 | Pic 2 | Scat | Wild |
| 305 | 5 | Q | A | Q | Pic 2 | Pic 2 |
| 306 | 6 | 10 | Pic 2 | K | J | A |
| 307 | 7 | Q | Pic 4 | K | Pic 1 | Q |
| 308 | 8 | Pic 2 | J | Wild | K | Pic 3 |
| 309 | 9 | A | Q | 10 | Q | 9 |
| 310 | 10 | 9 | A | Pic 1 | K | J |
| 311 | 11 | Pic 2 (351) | Pic 3 | 9 | Pic 4 | A |
| 312 | 12 | 10 (352) | 9 | Pic 3 | Pic 1 | K |
| 313 | 13 | Pic 1 (353) | K | A | Q | K |
| 314 | 14 | Pic 3 | **Feature** (354) | Q | **Feature** (354) | Pic 4 |
| 315 | 15 | K | Scat | J | Pic 2 | 9 |
| 316 | 16 | K | 10 | 10 | 9 | Scat |
| 317 | 17 | J | Wild | 10 | A | K |
| 318 | 18 | Pic 4 | Pic 2 | Scat | A | Pic 1 |
| 319 | 19 | Pic 4 | Q | Pic 2 | 10 | Pic 1 |
| 320 | 20 | Pic 1 | Q | J | K | 10 |
| 321 | 21 | 10 | Pic 3 | Pic 3 | Pic 3 | K |
| 322 | 22 | J | J | **Feature** (354) | Pic 3 | Pic 2 |
| 323 | 23 | Pic 3 | K | K | 10 | Q |
| 324 | 24 | 9 | 9 | 10 | J | K |
| 325 | 25 | Pic 4 | Pic 3 | 9 | Pic 1 | Pic 3 |
| 326 | 26 | A | Pic 4 | Pic 3 | 9 | Pic 4 |
| 327 | 27 | 10 | Scat | Q | 10 | Pic 4 |
| 328 | 28 | Pic 4 | K | Pic 2 | Wild (331) | 10 |
| 329 | 29 | 9 | 10 | J | Q | Pic 2 |
| 330 | 30 | Q | Q | Pic 4 | K | J |

*FIG. 3*

300

341 342 343 344 345

| | Reel strip position | Reel 1 | Reel 2 | Reel 3 | Reel 4 | Reel 5 |
|---|---|---|---|---|---|---|
| 301 | 1 | Pic 1 | 10 | Pic 3 | Q | Pic 1 |
| 302 | 2 | K | Q | K | A | 10 |
| 303 | 3 | J | K | 10 | 10 | A |
| 304 | 4 | Scat | Pic 1 | Pic 2 | Scat | Wild |
| 305 | 5 | Q | A | Q | Pic 2 | Pic 2 |
| 306 | 6 | 10 | Pic 2 | K | J | A |
| 307 | 7 | Q | Pic 4 | K | **CON. 355** | Q |
| 308 | 8 | Pic 2 | J | Wild | K | Pic 3 |
| 309 | 9 | A | Q | 10 | Q | 9 |
| 310 | 10 | 9 | A | Pic 1 | K | J |
| 311 | 11 | Pic 2 | **CON. 355** | 9 | Pic 4 | A |
| 312 | 12 | 10 | 9 | **CON. 355** | Pic 1 | K |
| 313 | 13 | Pic 1 | K | A | Q | K |
| 314 | 14 | Pic 3 | 9 | Q | **Feat. 354** | Pic 4 |
| 315 | 15 | K | Scat | J | Pic 2 | 9 |
| 316 | 16 | K | 10 | 10 | 9 | Scat |
| 317 | 17 | J | Wild | 10 | A | K |
| 318 | 18 | Pic 4 | Pic 2 | Scat | A | Pic 1 |
| 319 | 19 | Pic 4 | Q | Pic 2 | 10 | Pic 1 |
| 320 | 20 | Pic 1 | Q | J | K | 10 |
| 321 | 21 | 10 | Pic 3 | Pic 3 | Pic 3 | K |
| 322 | 22 | J | J | **Feat. 354** | Pic 3 | Pic 2 |
| 323 | 23 | Pic 3 | K | K | 10 | Q |
| 324 | 24 | 9 | 9 | 10 | J | K |
| 325 | 25 | Pic 4 | Pic 3 | 9 | Pic 1 | Pic 3 |
| 326 | 26 | A | **Feat. 354** | Pic 3 | 9 | Pic 4 |
| 327 | 27 | 10 | Scat | Q | 10 | Pic 4 |
| 328 | 28 | Pic 4 | K | Pic 2 | Wild | 10 |
| 329 | 29 | 9 | 10 | J | Q | Pic 2 |
| 330 | 30 | Q | Q | Pic 4 | K | J |

351 352 353 331

*FIG. 7A*

ELECTRONIC GAMING MACHINE AND METHOD FOR PROVIDING HOTSPOT FUNCTIONALITY TO GUI

RELATED APPLICATIONS

This application is a continuation under 35 U.S.C. § 120 of U.S. patent application Ser. No. 16/950,000, filed Nov. 23, 2020, and titled "ELECTRONIC GAMING MACHINE AND METHOD FOR PROVIDING HOTSPOT FUNCTIONALITY TO GUI," which issued on Apr. 11, 2023, and which claimed benefit of priority under 35 U.S.C. § 119(a) to Australian patent application numbers 2020239714, filed Sep. 24, 2020, and 2019904507, filed Nov. 29, 2019, the contents of each of which are hereby incorporated herein by reference in their entireties.

FIELD

The present application relates to a gaming machine and corresponding method for awarding cash on reel prizes associated with hot spot windows.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

The disclosure defines a gaming device configured to undertake selection of symbols in reel games which include feature symbols and configurable symbols. The gaming device is configured to identify the presence of one or more feature symbols in a game result of a particular instance of gameplay and to associate "hot spot window" status with each window having and/or neighboring (e.g. adjacent to) a feature symbol. Configurable symbols are associated with a configurable prize and, when a configurable symbol is selected for display in a hot spot window, the configurable prize is awarded (or displayed) along with a multiplier (including ×1) that may be associated with the hot spot window. Generally, multipliers increase when a hot spot window is associated with multiple feature symbols.

A gaming device is provided comprising: a display; a processor; and a memory. The memory includes a plurality of reel strips, each comprising a plurality of game symbols. At least one instance of a feature symbol is present on at least one of the plurality of reel strips. At least one instance of a configurable symbol is present on at least one same or adjacent reel strip to the, or each, reel strip comprising an instance of the feature symbol. The memory is interfaced with the processor and comprises program code. The program code is configured to cause the processor to: undertake gameplay of a primary game, wherein an instance of gameplay comprises determining a game state defining a display of a selection of the symbols of the plurality of reel strips, wherein each symbol is uniquely associated with a window; determine, after a particular instance of gameplay, whether one or more feature symbols are present within the resulting game state and, if present: determine one or more windows for modification based on the locations of the one or more windows associated with the one or more displayed feature symbols according to a predefined window selection rule; and determine and apply a modified status for the, or each, window for modification according to a predefined modification rule, control the display such as to present a visual depiction of the game state; and determine, after the particular instance of gameplay, whether one or more configurable symbols are present within windows having an associated modified status and, if present: determine, for the or each said configurable symbol, a prize award based on a prize value associated with the configurable symbol and the modified status associated with the window in which the configurable symbol is located; and award (or display) the prize.

A method of gameplay on a gaming device is also provided. The method includes a step of maintaining, in a memory of the gaming device, a plurality of reel strips, each comprising a plurality of game symbols, wherein at least one instance of a feature symbol is present on at least one of the plurality of reel strips and wherein at least one instance of a configurable symbol is present on at least one same or adjacent reel strip to the, or each, reel strip comprising an instance of the feature symbol. The method also comprises undertaking an instance of gameplay, where the gameplay comprises: determining a game state defining a display of a selection of the symbols of the plurality of reel strips, wherein each symbol is uniquely associated with a window; controlling a display of the gaming device such as to present a visual depiction of the game state; determining that at least one feature symbol is present within the resulting game state and, in response: determining one or more windows for modification based on the locations of the one or more windows associated with the one or more displayed feature symbols according to a predefined window selection rule; and determining and applying a modified status for the, or each, window for modification according to a predefined modification rule, and/or determining that one or more configurable symbols are present within windows having an associated modified status and, in response: determining, for the or each said configurable symbol, a prize award based on a prize value associated with the configurable symbol and the modified status associated with the window in which the configurable symbol is located; and awarding the prize.

The disclosure herein will be understood to pertain to at least the following implementations, although it will also be understood that further implementations may be apparent from the disclosure and that the specific implementations discussed below are not an exclusive list of implementations.

In some implementations, a gaming machine having a display, one or more processors, and one or more memories may be provided. The one or more memories may store information defining a plurality of reel strips, each reel strip comprising a plurality of symbols, wherein at least one instance of a feature symbol is included in at least one reel strip of the plurality of reel strips and wherein at least one instance of a configurable symbol is included in at least one same or adjacent reel strip, and computer-executable instructions that, when executed by the one or more processors, cause the one or more processors to undertake gameplay of a game. An instance of gameplay of the game may include determining a game state defining a display of a selection of the symbols of the plurality of reel strips in which each selected symbol is uniquely associated with a window. The computer-executable instructions may also, when executed by the one or more processors, cause, for at least one instance of gameplay, the one or more processors to: determine, after that instance of gameplay, whether one or more of the windows is uniquely associated with one of the one or more feature symbols according to the game state for that instance of gameplay; determine, for each window uniquely associated with one of the one or more feature symbols for that instance of gameplay, one or more windows for modification for that instance of gameplay based on the location of that window according to a predefined window selection rule; determine and apply a modified status for each window for modification for that instance of gameplay according to a predefined modification rule; cause the display to present a visual depiction of the game state for that instance of gameplay; determine, in association with that instance of gameplay, whether one or more configurable symbols are associated with one or more corresponding windows having the modified status currently applied thereto; and determine, in association with that instance of gameplay and for each configurable symbol associated with a corresponding window having the modified status currently applied thereto, a prize award based on a prize value associated with that configurable symbol and the modified status currently applied to the window associated therewith.

In some implementations, the information defining the plurality of reel strips may define at least three reel strips, the plurality of symbols for each reel strip that is interposed between two other reel strips may include at least one feature symbol, and the two reel strips that are not interposed between two other reel strips may have pluralities of symbols that do not include a feature symbol.

In some implementations, the one or more memories may further store additional computer-executable instructions that, when executed by the one or more processors, further cause the one or more processors to, for the at least one instance of gameplay, associate, for at least each window associated with an instance of the configurable symbol for that instance of gameplay and having the modified status currently applied thereto, a modifier with that window. The modifier may be based on the modified status currently applied to that window.

In some implementations, each modifier may be a multiplier and the one or more memories may further store additional computer-executable instructions that, when executed by the one or more processors, further cause the one or more processors to, for each prize award determined in association with a given instance of gameplay and for a given configurable symbol associated with a corresponding window having the modified status currently applied thereto, determine that prize award by multiplying a prize value associated with that configurable symbol by the modifier associated with the window associated with that configurable symbol.

In some such implementations, the multiplier for a corresponding window may be based on a number of times the modified status was applied to the corresponding window since the most recent instance in which the modified status was applied to the corresponding window without the corresponding window already having the modified status.

In some implementations, the predefined window selection rule may specific that the one or more windows for modification that are determined for each window uniquely associated with one of the one or more feature symbols for a given instance of gameplay are to include one or more windows such as a) the window uniquely associated with the feature symbol, b) each window horizontally adjacent to the window uniquely associated with the feature symbol, c) each window vertically adjacent to the window uniquely associated with the feature symbol, d) each window diagonally adjacent to the window uniquely associated with the feature symbol, ore) any combination of two or more of (a), (b), (c), and (d).

In some implementations, the one or more memories may further store additional computer-executable instructions that, when executed by the one or more processors, further cause the one or more processors to determine an end condition associated with the modified status applied to one or more of the windows and cause the modified status that has been applied to the one or more of the windows to be removed therefrom when the end condition has been met.

In some implementations, a non-transitory computer-readable medium may be provided that has stored thereon computer-executable instructions which, when executed by one or more processors of a gaming device having a display, cause the one or more processors to obtain information defining a plurality of reel strips, each reel strip including a plurality of symbols. At least one instance of a feature symbol may be included in at least one reel strip of the plurality of reel strips and at least one instance of a configurable symbol may be included in at least one same or adjacent reel strip. The computer-executable instructions may, when executed by the one or more processors of the gaming device, further cause the one or more processors to provide gameplay for a game, in which an instance of gameplay of the game includes displaying a selection of symbols from the reel strips in corresponding windows, and, for at least one instance of gameplay, determine, for that instance of gameplay, whether one or more of the windows display one of the one or more feature symbols according to the game state for that instance of gameplay; apply, for each window displaying one of the one or more feature symbols for that instance of gameplay, a modified status to one or more windows based on the location of that window and according to a predefined window selection rule; determine, in association with that instance of gameplay, whether one or more configurable symbols are displayed in one or more corresponding ones of the windows having the modified status currently applied thereto; and determine, in association with that instance of gameplay and for each configurable symbol displayed in a corresponding one of the windows having the modified status currently applied thereto, a prize award based on a prize value associated with that configurable symbol and the modified status currently applied to the window associated therewith.

In some such implementations, the information defining the plurality of reel strips may define at least three reel strips, each reel strip with two adjacent reel strips including at least one feature symbol, and the remaining reel strips not including a feature symbol.

In some implementations, the computer-executable instructions may further include computer-executable instructions that, when executed by the one or more processors, further cause the one or more processors to, for the at least one instance of gameplay and for at least each window both displaying an instance of the configurable symbol for that instance of gameplay and having the modified status currently applied thereto, associate a modifier with that window which is based on the modified status currently applied to that window.

In some such implementations, each modifier may be a multiplier and the computer-executable instructions may further include computer-executable instructions that, when executed by the one or more processors, further cause the one or more processors to, for each prize award determined in association with a given instance of gameplay and for a given configurable symbol displayed in a corresponding window having the modified status currently applied thereto, determine that prize award by multiplying a prize value associated with that configurable symbol by the modifier associated with the window displaying that configurable symbol.

In some implementations, the multiplier for a corresponding window may be based on a number of times the modified status was applied to the corresponding window since the most recent instance in which the modified status was applied to the corresponding window while the corresponding window did not already have the modified status applied thereto.

In some implementations, the predefined window selection rule may specify that for a given window that displays a feature symbol, the modified status is to be applied to the a) the given window, b) each window horizontally adjacent to the given window, c) each window vertically adjacent to the given window, d) each window diagonally adjacent to the given window, ore) any combination of two or more of (a), (b), (c), and (d).

In some implementations, the computer-executable instructions may further include computer-executable instructions that, when executed by the one or more processors, further cause the one or more processors to determine, for one or more windows having a modified status being applied in association with an instance of game play, an end condition associated with the one or more windows, and cause the modified status applied to the one or more windows to be removed therefrom responsive to the end condition being met.

In some implementations, a method executed by one or more processors may be provided. The method may include obtaining information defining a plurality of reel strips, each reel strip including a plurality of symbols, wherein at least one instance of a feature symbol is included in at least one reel strip of the plurality of reel strips and wherein at least one instance of a configurable symbol is included in at least one same or adjacent reel strip, and providing gameplay of a game in which an instance of gameplay of the game includes determining a game state. The method may further include, for at least one instance of gameplay, displaying a selection of the symbols of the plurality of reel strips, in which each selected symbol is displayed a corresponding window; determining, after that instance of gameplay, whether each of one or more of the windows are displaying one of the one or more feature symbols according to the game state for that instance of gameplay; applying, for each window displaying one of the one or more feature symbols for that instance of gameplay, a modified status to thereto according to a predefined modification rule; determining, in association with that instance of gameplay, whether one or more configurable symbols are displayed in one or more corresponding windows having the modified status currently applied thereto; and determining, in association with that instance of gameplay and for each configurable symbol displayed in one of the windows having the modified status currently applied thereto, a prize award based on a prize value associated with that configurable symbol and the modified status currently applied to the window displaying that configurable symbol.

In some implementations of the method, the method may further include associating, for at least one instance of gameplay and for at least each window displaying an instance of the configurable symbol for that instance of gameplay and having the modified status currently applied thereto, a modifier therewith, in which that modifier is based on the modified status currently applied thereto.

In some such implementations, each modifier may be a multiplier and the method may further include, for each prize award determined in association with a given instance of gameplay and for each configurable symbol associated with a corresponding window having the modified status currently applied thereto, multiplying a prize value associated with that configurable symbol by the modifier associated with the window associated with that configurable symbol to determine the prize award.

In some implementations of the method, the multiplier for a corresponding window may be based on a number of times the modified status was applied to the corresponding window since the most recent instance in which the modified status was applied to the corresponding window without the corresponding window already having the modified status.

In some implementations, the predefined window selection rule may specify that for a given window that displays a feature symbol, the modified status is to be applied to a) the given window, b) each window horizontally adjacent to the given window, c) each window vertically adjacent to the given window, d) each window diagonally adjacent to the given window, or e) any combination of two or more of (a), (b), (c), and (d).

In some implementations of the method, the method may further include determining, for one or more of the windows having a modified status being applied thereto, an end condition associated with that modified status, and causing that modified status to be removed from the one or more windows to which that modified status is applied responsive to the end condition being met.

BRIEF DESCRIPTION OF THE DRAWINGS

FIG. 3 illustrates an example reel strip layout including feature symbols.

FIGS. 7A-7E relate to awarding prizes based on hot spot windows.

DETAILED DESCRIPTION

Figure 1:
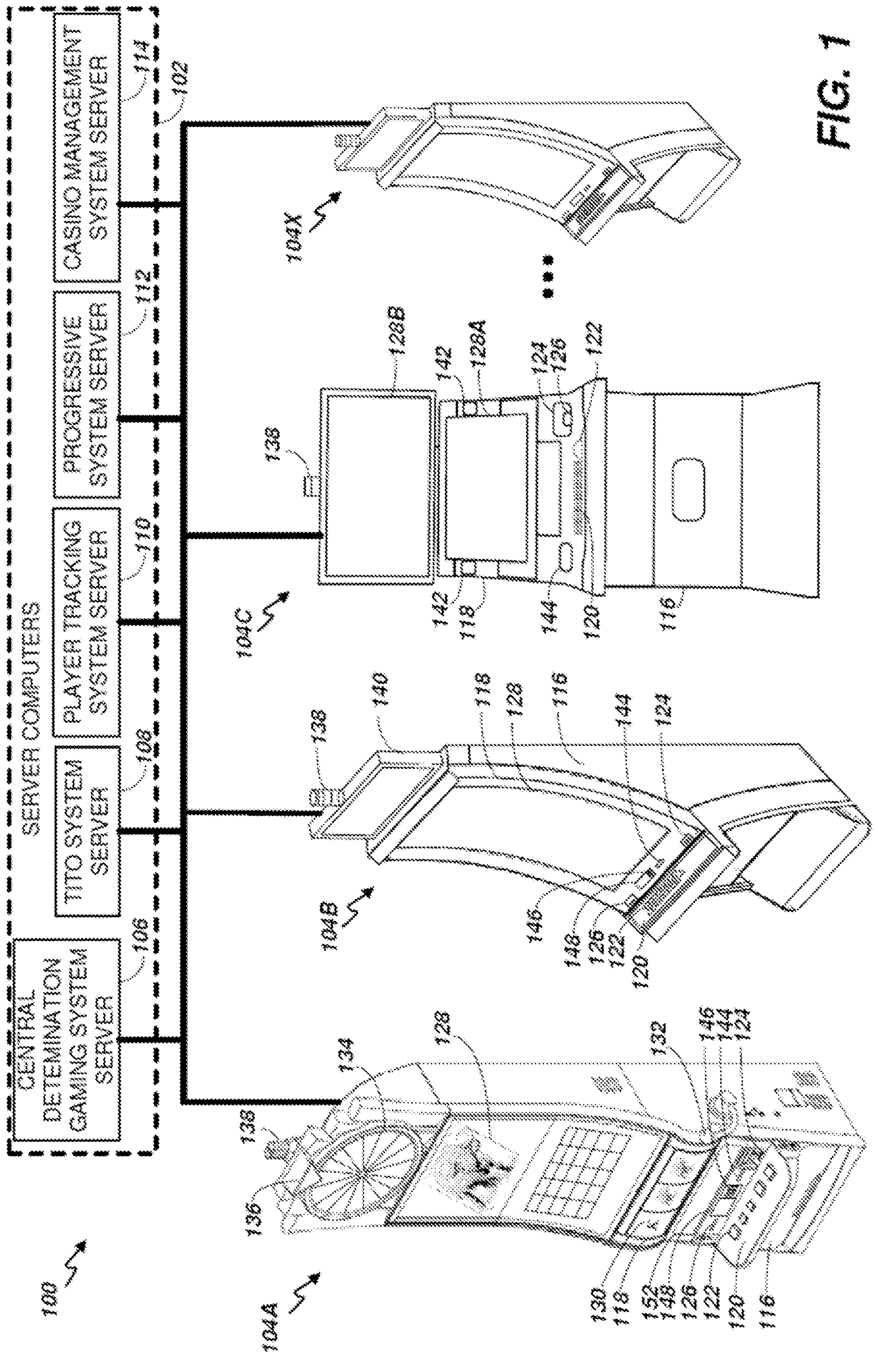
FIG. 1 is an exemplary diagram showing several EGMs networked with various gaming related servers.

As noted earlier, this disclosure is directed to various systems and techniques for providing "hot spot" features in symbol-based games, e.g., slot machine or similar games. In such systems or techniques, one or more reel strips or reels (which may be virtual reel strips or reels, e.g., ones that represented by a data structure in a computing system's memory) of a symbol-based game may each include one or more feature symbols, one or more configurable symbols, or both one or more feature symbols and one or more configurable symbols. During an instance of play, symbols from each reel strip are selected for display to a player, with each displayed symbol being shown in a corresponding window. If the symbol shown in a window during a particular instance of play is a feature symbol, the system (or technique) may apply a "hot spot" status to one or more windows that are associated with that window in some way, e.g., according to their relative positioning with respect to that window. The hot spot status for a window may persist for a predetermined number of game play instances, e.g., 3 game play instances, and if configurable symbols are displayed in a window while the window has a hot spot status, an award associated with the configurable symbol may be modified based on that window's hot spot status. If a window has a feature symbol is shown in a window that has an active hot spot status applied thereto, this may be treated, in effect, as an additional hot spot status for that window. In such situations, the modification of the award associated with any configurable symbols that are shown in a window with an active hot spot status may be enhanced based on the number of active hot spot statuses that are applied to that window. In some implementations, if a feature symbol is shown in a window while any windows for the game have hot spot status currently active, those windows with already active hot spot statuses may have those hot spot statuses persist until the most recently applied hot spot status expires.

In terms of technical effects, the hot spot windows described throughout the disclosure deliver improvements to electronic gaming software, UI design, and/or gaming devices by providing new and/or improved gaming device operations that comply with gaming regulations. Specifically, a gaming device may be specially programmed to present and implement hot spot windows that improve the usability of the gaming devices, enhance a player's understandability of obtaining certain game outcomes, provide another approach to presenting how a gaming device builds equity in a game, and implement new and/or improved gaming device operations that comply with gaming regulations. In particular, the use of feature symbols to trigger hot spot status for symbol-display windows such as are described herein provides a limited-duration persistence feature that cause awards associated with certain symbols that are shown in windows with such hot spot statuses active to be modified in some manner during multiple subsequent spins. Each time such a symbol lands in a window with an active hot spot status in a subsequent spin, the gaming device may pay out the credit value for that symbol as modified according to the active hot spot status(es) associated with that window when the symbol is shown in that window. By having the hot spot windows persist over multiple subsequent spins, the gaming device can generate randomized game outcomes that build game equity over the course of multiple spins. Additionally, having multiple windows that have hot spot status applied to them as the result of only one window showing a feature symbol provides for greater game volatility and thus increased excitement and anticipation to players. Furthermore, by applying hot spot status to multiple windows as the result of only one window showing a feature symbol, the chances of having windows with multiple hot spot statuses applied, and thus potentially higher payouts for certain outcomes, are increased.

In contrast, other implementations that randomly trigger payout of credit symbols, such as landing a certain number of credit symbols or landing a specific trigger symbol, do not persist and are unable to accrue over spins. As an example, when a given spin lands a specific trigger symbol that triggers a payout operation for credit symbols, the specific trigger symbol is not held for or persists to a next spin to potentially trigger another payout operation. These and other technical features are described in greater detail later in the disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
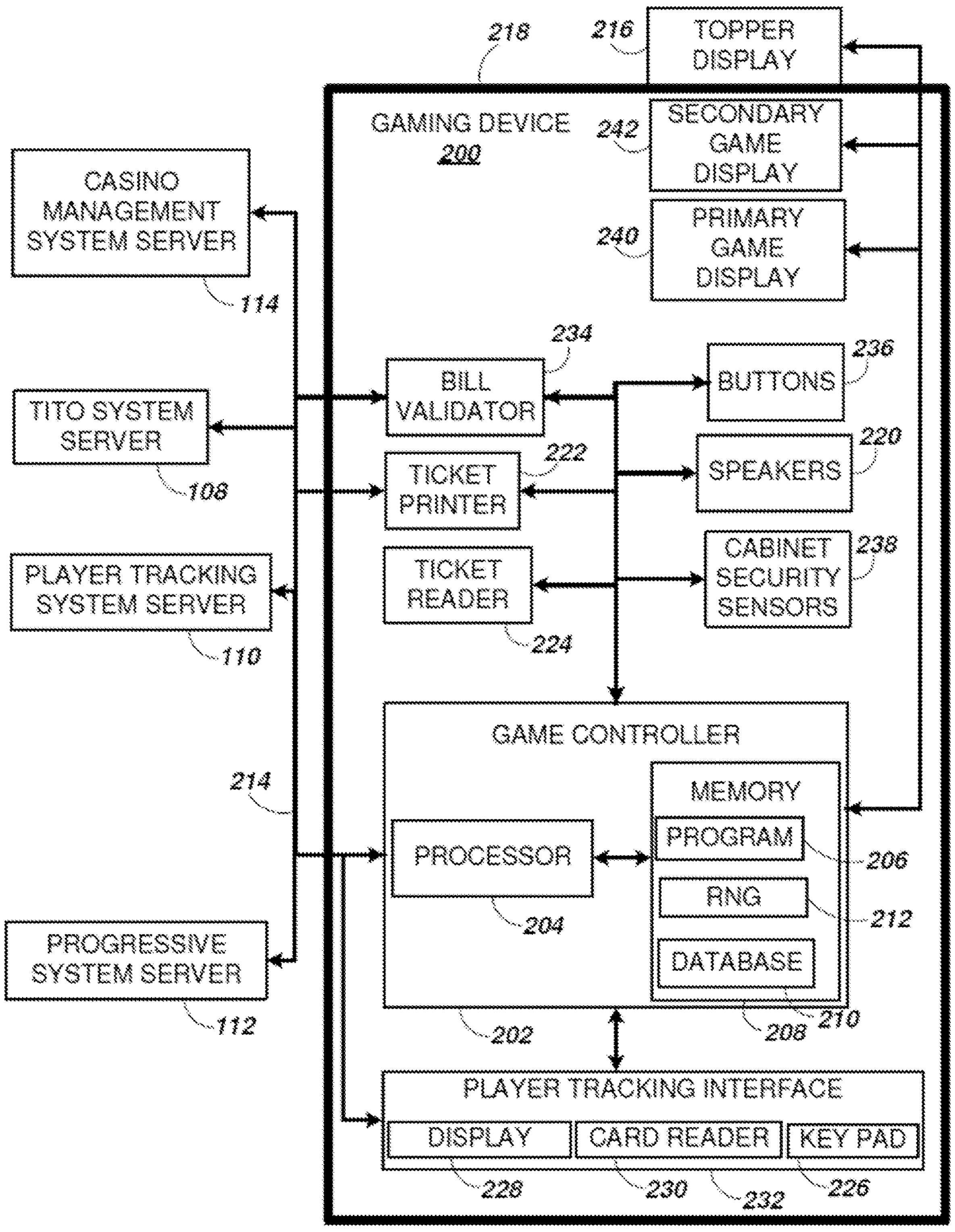
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc' model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix' model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

FIG. 3 illustrates an example of a set 300 of five reel strips 341, 342, 343, 344, 345. In the example, each reel strip has thirty reel strip positions 301-330. Each reel strip position of each reel strip has a symbol. For example, a "Wild" symbol 331 occupies the twenty-eighth reel strip position 328 of the fourth reel strip 344. Other reel strips than those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
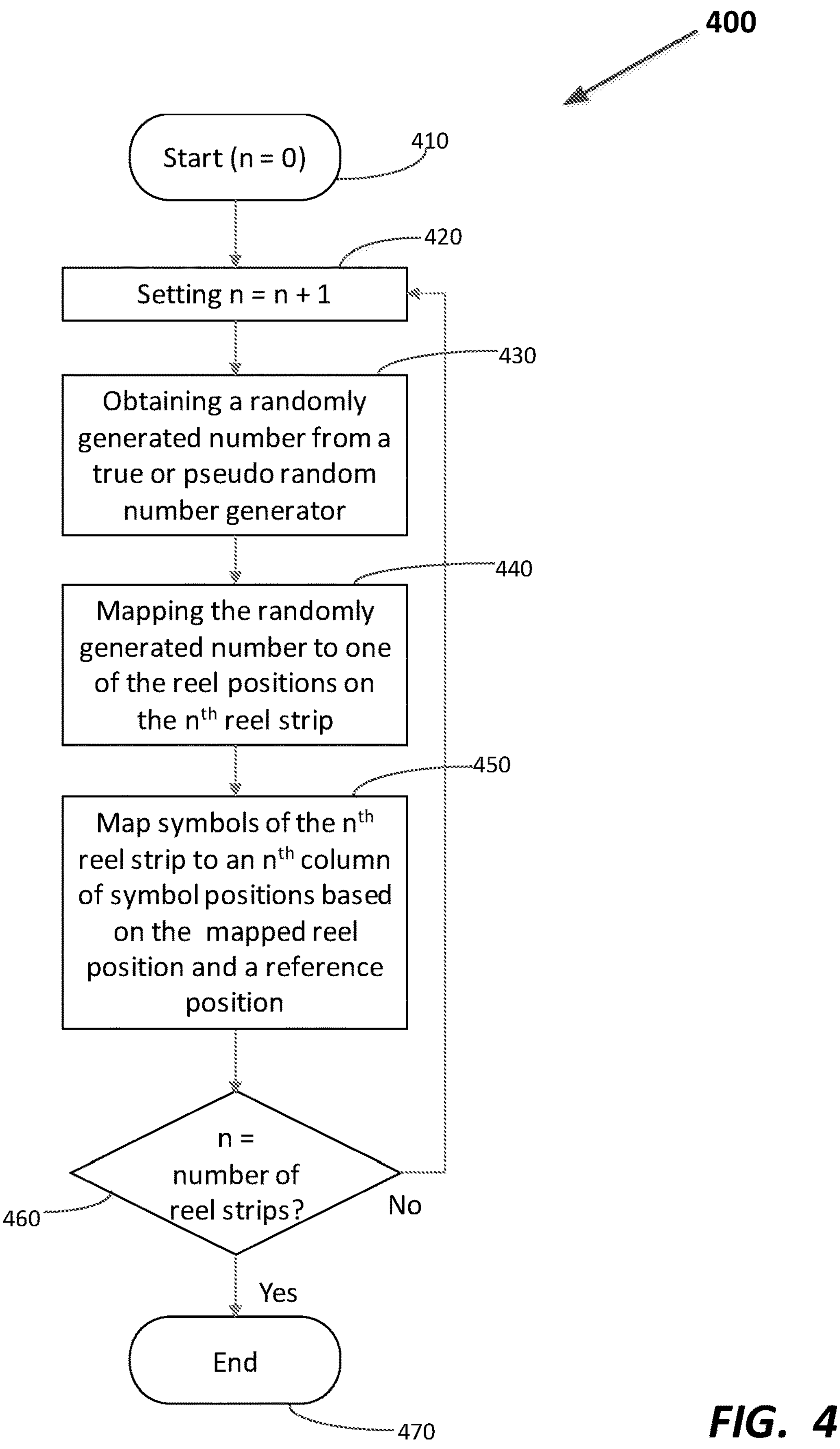
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel strip positions of the nth reel strip. In the first iteration, this is the first reel strip. To map the generated number to one of the reel strip positions, the possible values that can be returned from the RNG 212 are divided into ranges and associated with specific ones of the reel strip positions in memory 208. In one example, these ranges are stored as a look-up table. In one example, the ranges are each the same size so that each of the reel strip positions has the same chance of being selected. In other examples, the ranges may be arranged to weight the relative chances of selecting specific reel strip positions. The reel strips may be of different lengths.

At step 450, the processor 204 maps symbols of the nth reel strip to an nth column of symbol display positions based on the mapped reel strip position and a reference position. In an example, the reference position is the bottom position of the symbol positions of each column of symbol positions. In this example, the selected reel strip position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel strip position 313, then for the first reel strip 321, "Pic 1" symbol 353 is mapped to a bottom symbol position, "10" symbol 352 is mapped to a middle symbol position, and "Pic 2" symbol 351 is mapped to a top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol positions, the processor 204 controls display 240 to display them at the symbol positions.

Referring back to FIG. 3, there are also shown one or more feature symbols 354 located at specific positions 301-330. The specific positions are chosen to provide a desired probability of a feature symbol 354 being selected during gameplay (as described, for example, with reference to FIG. 4). That is, a probability of selection can be increased by increasing the number of instances of feature symbol 354 present on a particular one of the five reel strips 341-345. For the purposes of this example, one feature symbol 354 is shown present on each of internal reel strips 342, 343, 344.

Herein, "internal" refers to the reel strips 342, 343, 344 which, when displayed on primary display 240, have adjacent reel strips 341-345 located on both sides. In contrast, as used herein, "external" refers to the reel strips 341, 345 located on the outside of the other reel strips 342-344 (i.e. having only one adjacent reel strip 341-345).

According to the embodiment shown, the feature symbols 354 are restricted to being located on internal reel strips 342-344. This can provide an advantage in that it ensures that any selected and displayed feature symbol 354 will have other selected and displayed symbols located on each of its immediately adjacent columns.

Figure 5:
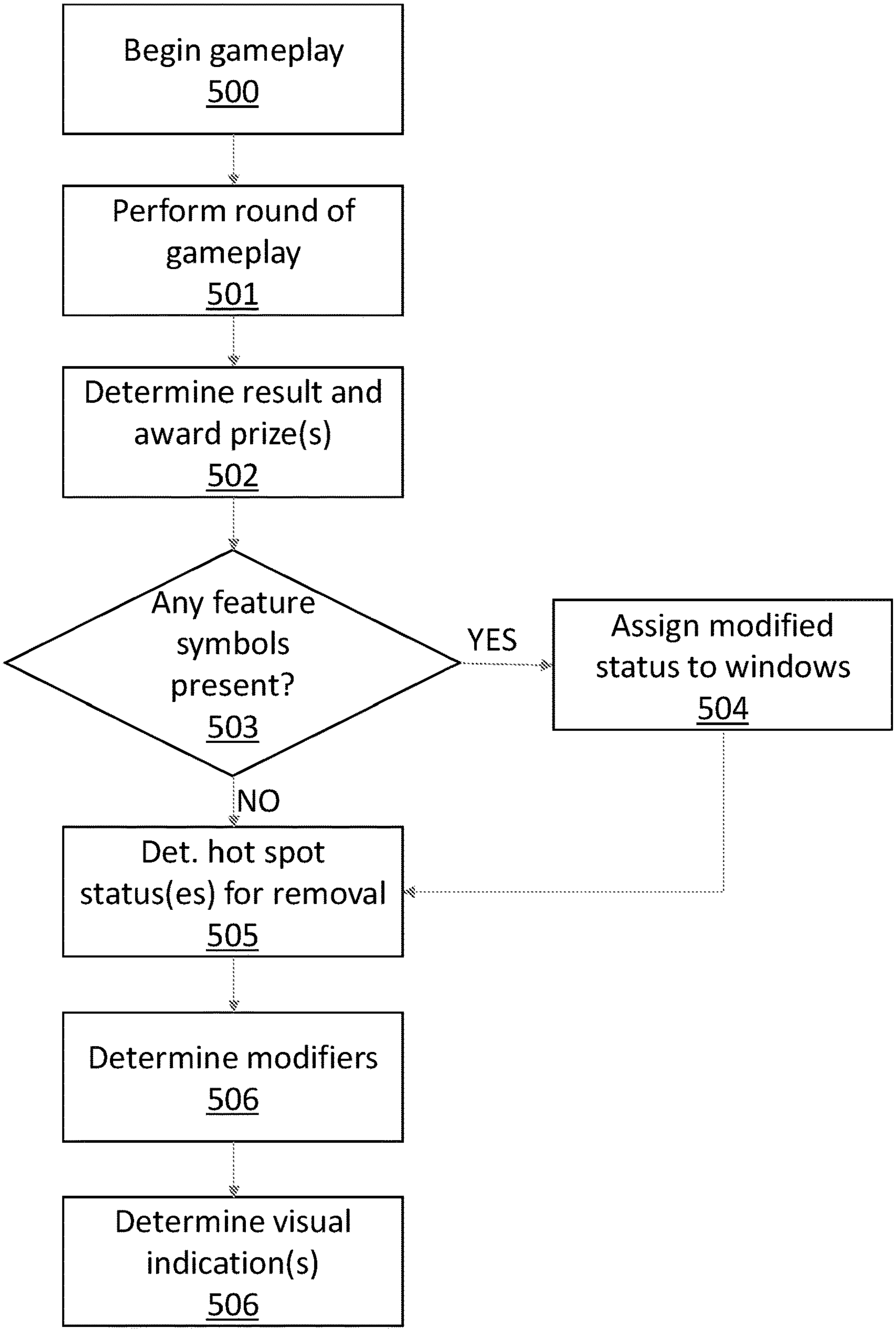
FIG. 5 shows a method for managing feature symbols.

FIG. 5 shows a method for gameplay of a hot-window game on the gaming device 200, according to an embodiment. Particular examples of the display 240 during said gameplay are shown in FIGS. 6A-6E.

Figure 6A:
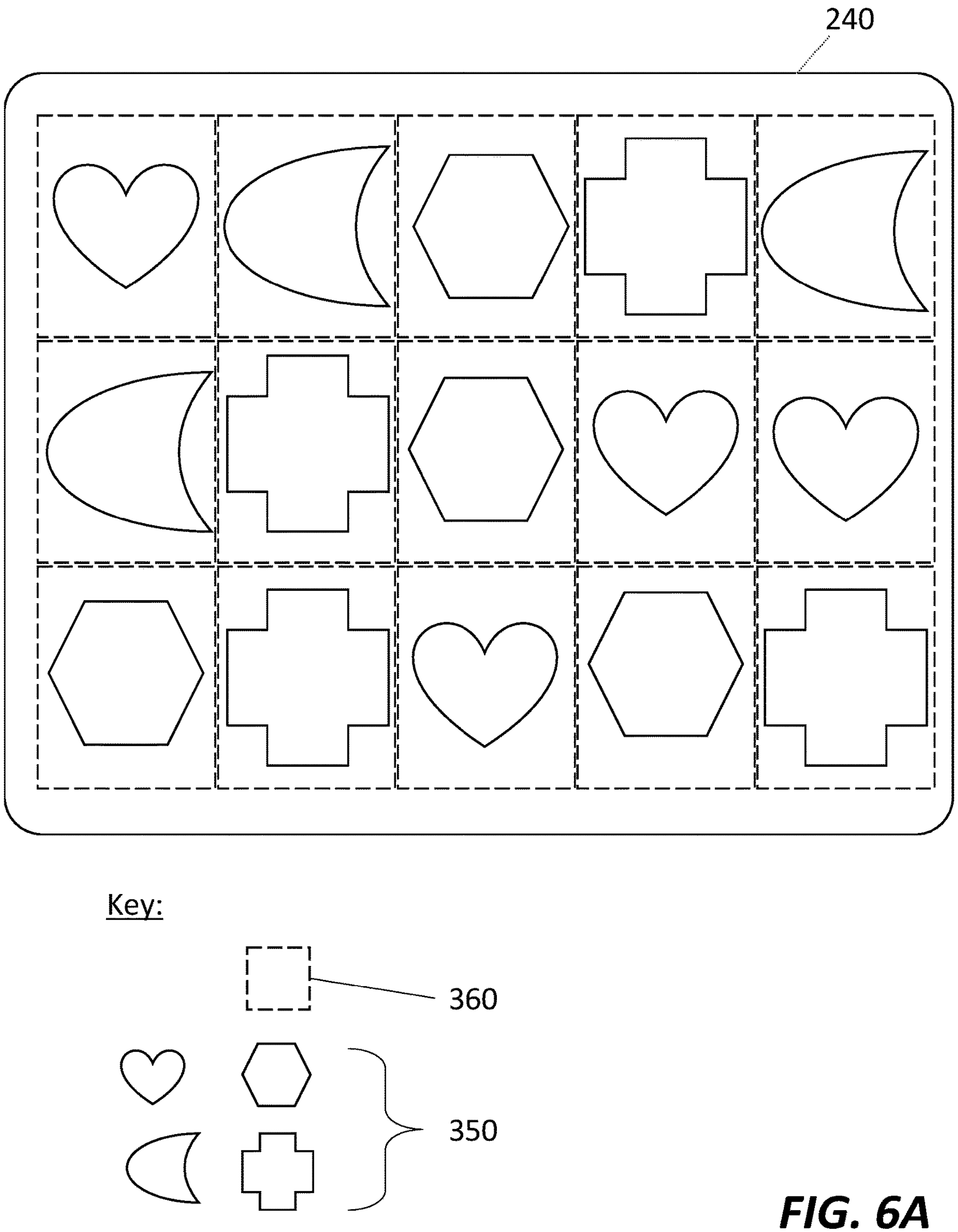
FIGS. 6A-6E show visual representations of game play with features symbols.

At step 500, the gaming device 200 is in a previously determined game state as shown in FIG. 6A and receives a command to perform a round of gameplay. Here, there is shown a display of previously selected symbols 350—note that, in the example of FIG. 6A, each of the selected symbols 350 is not a feature symbol 354. Each symbol 350 is located within a window 360 such that each window 360 is associated with a single symbol 350. In the figure, the windows 360 are shown as bordered regions, however, in implementations the windows 360 may not be visually defined, or the visual definition may be dependent on a game state. The windows 360 correspond to symbol display positions, previously described. It should be understood that the previously determined game state may instead correspond to a different state of the gaming device 200—for example, a menu or intro screen before a player begins gameplay (such as, from a game selection screen).

At step 501, an instance of gameplay is performed. Gameplay includes selection of symbols 350 for each window 360, for example according to the embodiment of FIG. 4. The method proceeds to step 502, where a game result is determined and any relevant prize award made—for example, as described further below with reference to FIGS. 7A-7C.

A check is then made, at step 503, as to whether one or more feature symbols 354 have been selected for display on the display 240 of the gaming device 200. In the event that no feature symbol 354 has been selected, the method continues to step 505.

Figure 6B:
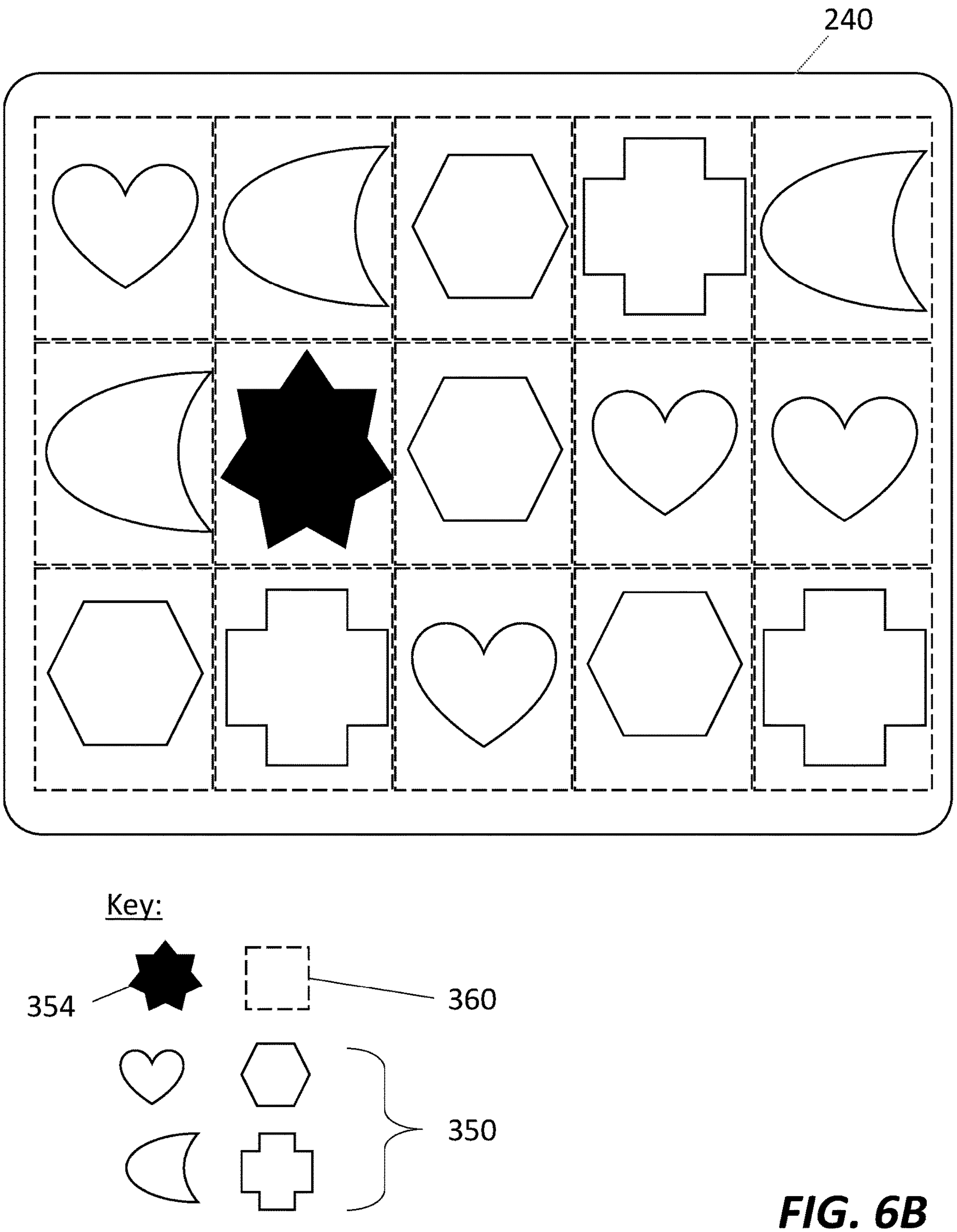

However, if the result of step 503 is the determination that one or more feature symbols 354 are selected for display, the method proceeds to step 504. FIG. 6B shows an example result of a round of gameplay where one or more (here one)

feature symbols 354 are selected as a result of the symbol selection method. As can be seen, the display 240 comprises the feature symbol 354 and remaining symbols 350 each located within a respective window 360.

At step 504, the gaming device 200 is controlled so as to assign a modified status to the, or each, window 360 comprising and/or neighboring a feature symbol 354. A window 360 associated with a modified status is herein referred to as a hot spot window 361 (shown in FIG. 6C, discussed below). One or multiple neighboring hot spot windows 361 associated with the same feature symbol 354 are herein referred to as a hot spot zone. Also, at step 504, each relevant adjacent window 360 to the window 360 (or windows 360) comprising a feature symbol 354 is also assigned a modified status. In an embodiment, the modified status is associated with a game instance indicator (e.g. a count-down timer) such that the particular game instance in which the modified status was assigned can be determined. Which particular windows 360 are assigned a modified status is determined according to a predefined window selection rule.

In an embodiment, the window selection rule specifies that an adjacent window 360 is a window 360 located directly above or below the window 360 comprising a feature symbol 354. In an embodiment, window selection rule specifies that an adjacent window 360 is a window 360 located directly to the left or to the right of the window 360 comprising a feature symbol 354. In an embodiment, window selection rule specifies that an adjacent window 360 is a window 360 located directly along a diagonal in one of four directions of the window 360 comprising a feature symbol 354. In an embodiment, two or more (for example, all) of the previously described window selection rules are combined—for example, the window selection rule specifics that each window 360 directly above, below, to the left, to the right, and along a diagonal are assigned a modified status. In an embodiment, the window selection rule specifies that an adjacent window 360 may be a wrap-around window 360—that is, when there is no window 360 directly adjacent a feature symbol 354 in a horizontal and/or vertical direction (depending on implementation), the window 360 furthest in the opposite direction is selected as a hot spot window 361.

Next, at step 505, the gaming device 200 determines whether any previous hot spot window 361 (that is, a hot spot window 361 of a directly preceding game state) is to have its modified status removed—that is, reverted back to a standard window 360. In an embodiment, the gaming device 200 determines whether an end condition has been met for each hot spot window 361 and, if so, removes the modified status.

In an embodiment, an end condition corresponds to a defined number of instances of gameplay since the modified status was assigned (e.g. as determined by the game instance indicator)—this may be set, for example, such that each hot spot window 361 expires after three game instances. Where a modified status is again assigned to a hot spot window 361 before it expires, the end condition is re-calculated from the newest modified status. Advantageously, each hot spot window 361 is associated with its own end condition—that is, the end conditions may vary between different hot spot windows 361 and may even vary between hot spot windows 361 within the same hot spot zone.

In another embodiment, the end condition is common for all hot spot windows 361 (and hence common for all hot spot zones). For example, the end condition is based on the most recent round of gameplay where a feature symbol 354 was present (e.g. a predefined number, such as three, rounds from the most recent comprising a feature symbol 354). In this way, the presence of a feature symbol 354 in a game result can act to reset the end condition for existing hot spot windows 361—thus prolonging the total time that said existing hot spot windows 361 are present.

To be clear, it is contemplated that expiry of hot spot statuses for windows may, according to different implementations, be handled in different ways, depending on the particular game architecture or configuration. For example, as outlined above, in some implementations, such a game may be configured so that there is a single end condition for all windows, and when that end condition is met, all hot spot statuses applied to the windows in that game are removed or deactivated. In such implementations, the end condition (or a parameter that is used to evaluate the end condition) may be re-set each time a hot spot status is applied to a window—regardless of whether there were (unexpired) hot spot statuses still applied to windows as the result of previous game play instances when the new hot spot status is applied. This, in effect, results in the hot spot statuses continuing to accumulate for the various windows until a predetermined number of consecutive game play instances occurs in which no feature symbols are displayed in any windows, at which point the hot spot statuses all expire simultaneously.

In yet another implementation, a set of windows with hot spot statuses applied may be associated with an end condition that governs the expiry of all of the hot spot statuses applied to the windows within that set of windows. The set of windows may be determined in a variety of ways, but most commonly will be a set of windows where each window in the set is edge-adjacent to another window in the set (and where all windows in the set have at least one hot spot status applied). In such implementations, there may be multiple such sets that are identified for a given game instance, and each may have its own, independent end condition. In some further such implementations, two or more such sets may, as a result of a hot spot status being newly applied to a window that was previously not in any of the sets, be joined together into a single, larger set of windows. In such cases, the end condition associated with the combined set of windows may be set to be the end condition associated with the merged sets that would expire the latest of the end conditions associated with the merged sets.

In an alternative implementation, each window may have its own end condition that, when reached, may cause all hot spot statuses applied to that window to expire simultaneously. As in the previous example, the end condition (or a parameter used to evaluate the end condition) may be re-set each time a new hot-spot status is applied to that window. Thus, if a window has a hot spot status applied that will expire after three instances of game play occur, and that window then has another hot spot status applied to it two game instances later, the end condition for that window—which would have caused the hot spot status to expire after the next instance of game play—may be reset so that expiration of the hot spot statuses for that window does not occur until three game play instances after the most recently applied hot spot status is applied.

In yet other implementations, each hot spot status applied to each window may have its own end condition. In such implementations, for example, the end condition for each applied hot spot status may cause that hot spot status to expire and be removed after a predetermined number, e.g., three, of instances of game play occur. In such implementations, windows with multiple applied hot spot statuses may see one or more such hot spot statuses expire and be removed when their associated end conditions are met, but other hot spot statuses that are applied to those windows and for which the associated end conditions have not yet been met may continue to be applied to that window until those associated end conditions are met. In such implementations, the number of simultaneously applied hot spot statuses for a given window may increase and/or decrease as new hot spot statuses are applied and already applied hot spot statuses expire.

In some such implementations, one or more of the end conditions (or the parameters used to evaluate them) for the hot spot status(es) applied to a window may be modified if an additional hot spot status is applied to that window. For example, the end condition for such previously applied hot spot statuses may be modified such that each such previously applied hot spot window will persist for a predetermined number of additional game play instances, e.g., one or two additional game play instances. By way of further example, if the end condition for a first hot spot status for a given window causes the first hot spot status to expire after three instances of game play and a second hot spot status is applied to that window two game instances later, the end condition (or the parameter used to evaluate it) may be modified such that the first hot spot status will continue to be applied not only during the third game play instance, but also the fourth game play instance after that. In this manner, the player gets an additional game play instance in which that window has two active hot spot statuses, thereby further increasing their chance of achieving a higher payout should a configurable symbol be shown in such a window. The method then proceeds to step 506, where a determination of a modifier for each hot spot window 361 is made. In one embodiment, step 505 corresponds to assigning a predefined modifier to each hot spot window 361 (i.e. each window 360 associated with a modified status). For example, the modifier may be a predefined multiplier (e.g. a "×1" multiplier or alternatively a "×2" multiplier).

In another embodiment, the modifier is dynamically determined (at least in part) based on whether or not the particular hot spot window 361 is associated with multiple feature symbols 354. In one example, the multiple feature symbols 354 are selected in successive rounds of game play before any expiry of a modified status associated with a previously selected feature symbol 354 for that hot spot window 361. Visually, this corresponds to whether or not the window 360 was previously displayed (i.e. directly preceding the current instance of gameplay) as a hot spot window 361. If the window 360 was not previously a hot spot window 361, it is provided the smallest of a set of modifiers—for example, a modifier of ×1. If the window 360 was previously a hot spot window 361, it is assigned the next modifier in a set of modifiers (that is, the next with respect to its previous modifier). In another example, the multiple feature symbols 354 may be selected for display during the same round of game play. Visually, this corresponds to the partial overlap of two or more simultaneous hot spot zones.

In an embodiment, each modified status is associated with a value indicating the number of times a modified status has been applied (without subsequent removal). For example, where a modified status is applied to a window 360 not having a modified status, its value is 1 (or other value indicating a first instance of modified status). Should another modified status be applied to that same window 360 (now a hot spot window 361), the modified status is updated to a value of 2 (or other value indicating a second instance of modified status). Generally, there are as many values of modified status as there are modifiers.

In one example, the set of modifiers (in order from smallest to largest) comprises: "×1", "×2", "×4". The set may be unlimited, but it is preferred that it comprises a maximum modifier. In the case in which the previous modifier is the maximum modifier, then the new modifier is simply the maximum modifier from the set. For example, a first selection of a modifier may be "×1", a subsequent selection is "×2", and a subsequent selection "×4". Of course, other sets may comprise different modifiers, for example, "×1", "×2", "×3".

Figure 6C:
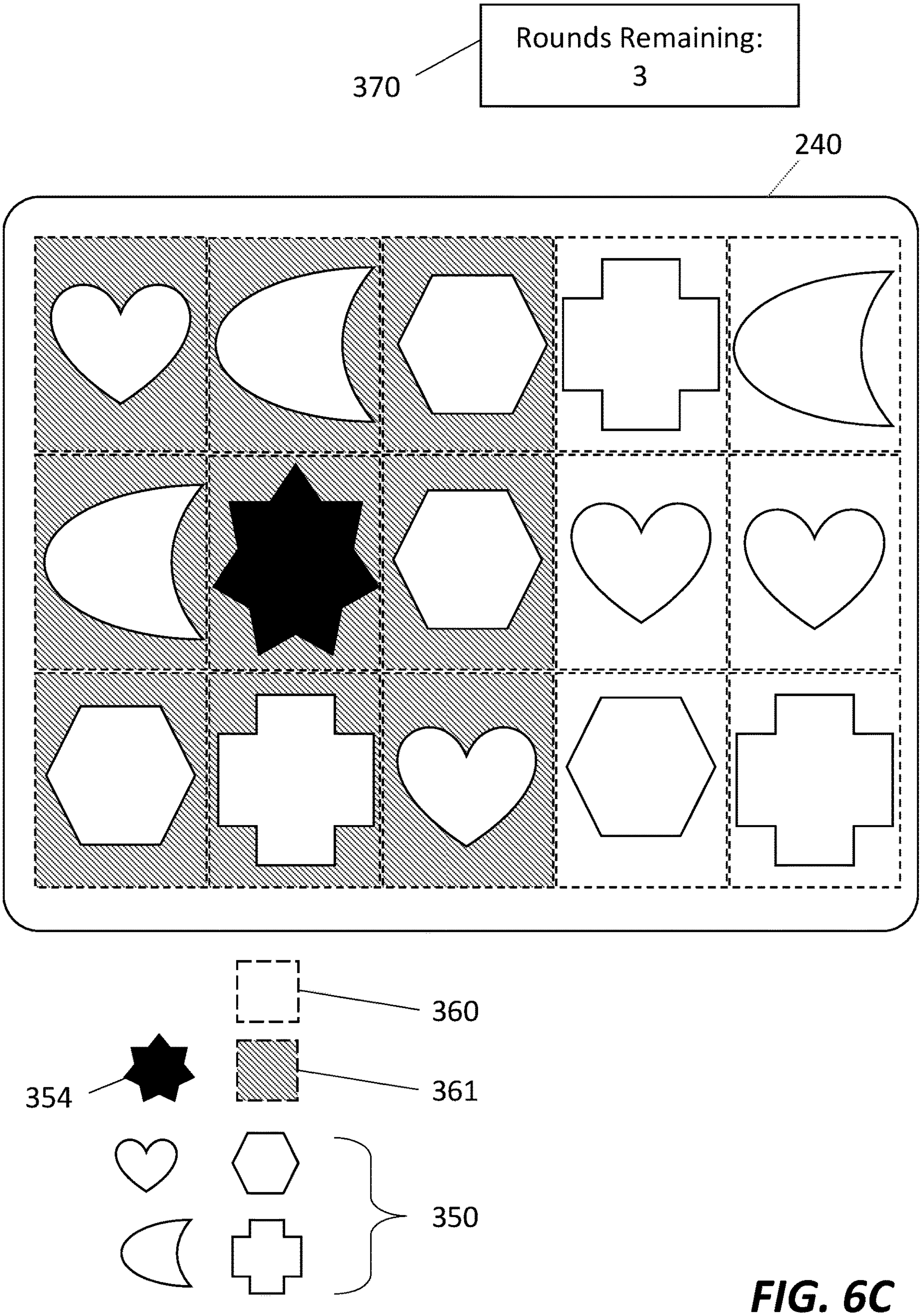

FIG. 6C shows an example of hot spot windows 361 as a result of the instance of gameplay shown in FIG. 6B. Here, there are nine resulting hot spot-windows 361 forming a hot spot zone.

At step 507 (referring back to FIG. 5), a visual indication 370 is determined and presented on the display 240 for each hot spot window 361 (as shown in FIG. 6C). In an embodiment, the primary display 240 (or, optionally where applicable, the secondary display 242) is configured to display a visual indication 370 of a number of "rounds" remaining associated with the one or more displayed hot spot windows 361. For example, as shown in FIG. 6C, where the same end condition is applicable to all hot spot windows 361, a single number is shown as the visual indication 370 (optionally with descriptive elements such as text or graphical cues) indicating the number of instances of gameplay remaining before the end condition is met. In another embodiment (not shown), the visual indication 370 is at least partly determined according to a current modifier associated with the particular hot spot window 361. For example, there may be a particular predefined visual indication 370 associated with each multiplier of the set of multipliers—in this case, the visual indication 370 for a particular hot spot window 361 is determined to be the visual indication 370 associated with the multiplier determined for that hot spot window 361 at step 505. For example, different colors and/or sizes of window border may be utilized and/or different colors of the interiors of the hot spot windows 361. Where a hot spot window 361 was present after the previous instance of game play, it may be that the determined visual indication 370 is simply the same as the previous round. However, it is envisaged that the visual indication 370 may be modified in accordance with a number of instances of game play since assigning of the modified status to the particular hot spot window 361. A key may be displayed indicating which hot spot windows 361 are associated with which end conditions (e.g. based on the color of the hot stop windows). In an embodiment, each hot spot window 361 is associated with its own visual indicator 370 (e.g. a number displayed in conjunction with the hot spot window 361 indicating how many instances of gameplay remain before that hot spot window 361 reverts to a normal window 360).

Figure 6D:
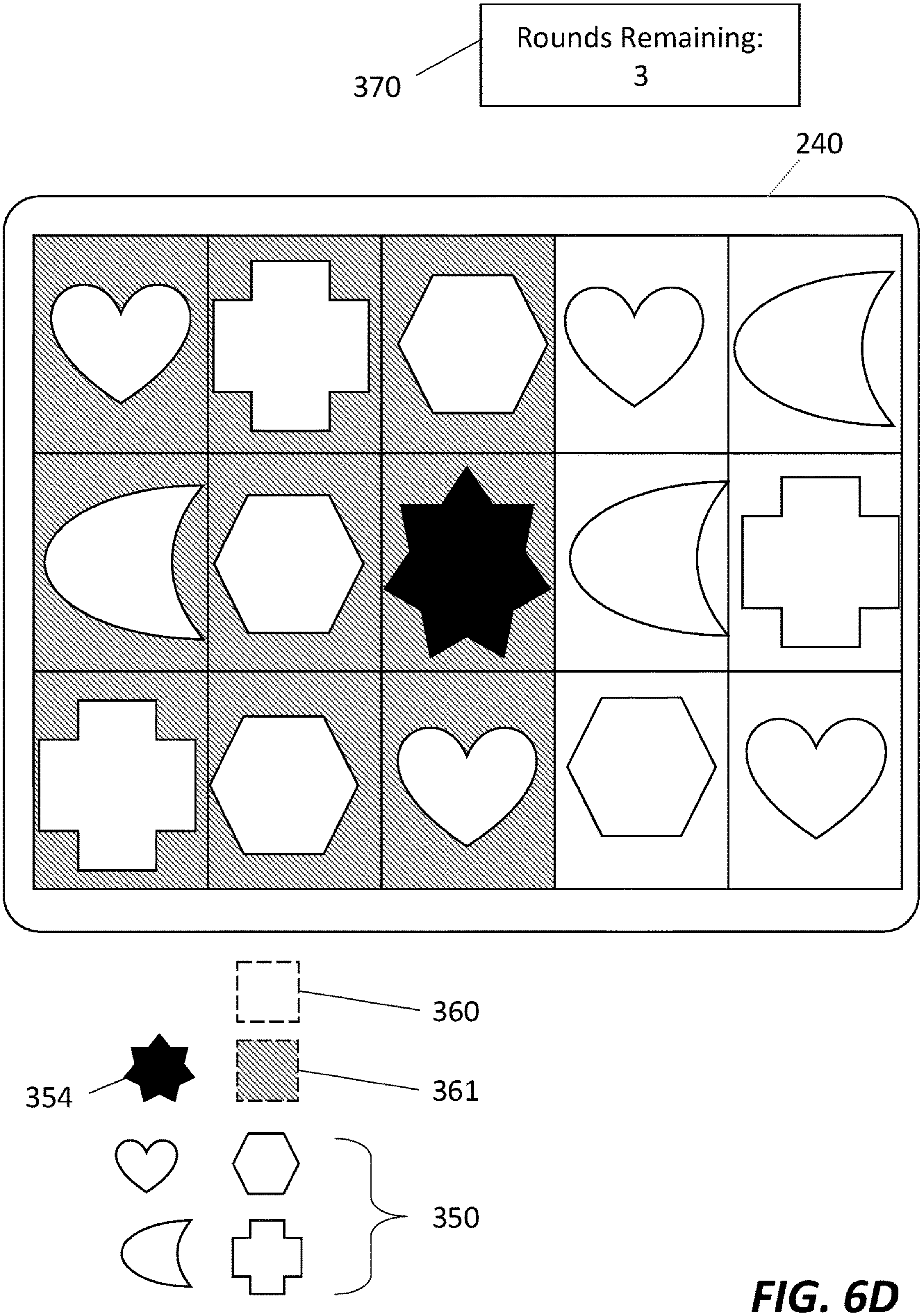
Figure 6E:
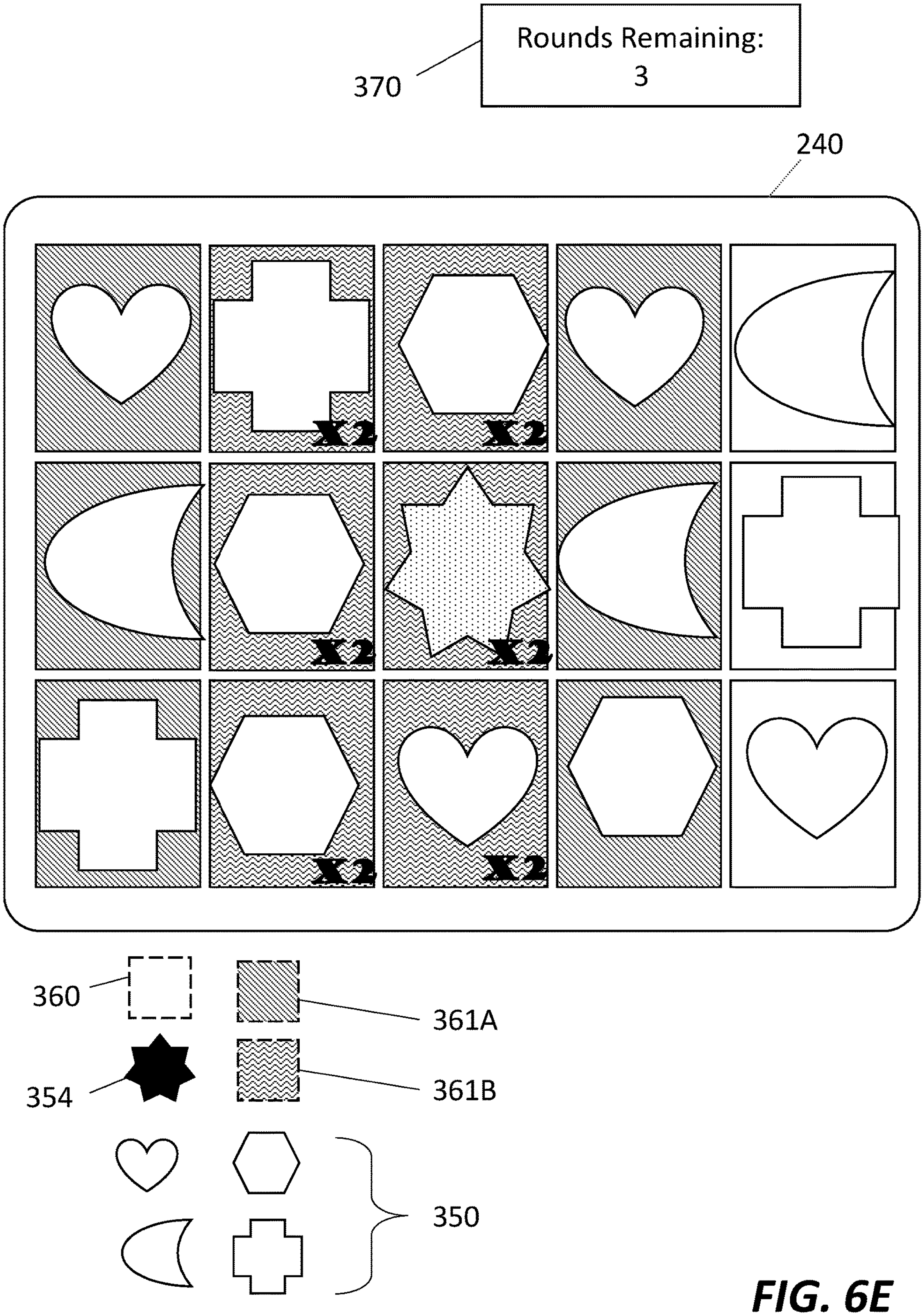

FIG. 6D shows an example of a game result subsequent to that shown in FIG. 6B, where a new feature symbol 354 results—as can be seen, there is an overlap between windows 360 which will be newly turned into hot spot windows 361 and those that already were hot spot windows 361. Thus, in FIG. 6E, the result is shown with two different hot spot windows 361A and 361B (the former associated with a first modifier and the latter with a different, larger modifier). Note that, in this figure, the larger modifier is also displayed ("×2").

Additionally, at step 507, any previous window 360 displayed as a hot spot window 361 that has had its modified status removed will have its visual appearance returned to a standard window 360 (i.e. it will no longer appear as a hot spot window 361).

As a result of steps 504-507, the display of windows 360 has been updated to reflect the new hot spot windows 361 (if present) resulting from the present instance of gameplay. The display will typically also include hot spot windows 361 carried over from the previous instance of gameplay (i.e. those not removed as a result of step 505).

The gaming device 200 can then return to step 500, that is, prepared for another instance of gameplay. However, as a result of steps 504-507, in most cases, the display will comprise a different arrangement of hot spot windows 361 unless no new hot spot windows 361 have been assigned and no previous hot spot window 361 removed.

It should be understood that various of steps 500-507 can be undertaken in different orders without affecting the substance of gameplay as perceived by the player of the gaming device 200. For example, step 505 may occur directly after step 502—that is, removal of hot spot windows 361 may occur before determination of new or modified hot spot windows 361.

The hot spot windows 361 are generally associated with a change in the possible gameplay outcomes for the player of the gaming device 200. That is, the presence of one or more hot spot windows 361 and the associated multipliers can affect the payout to the player (see step 502) for particular arrangements of selected symbols 350. For example, in a general sense, if one or more symbols 350 are present at the location of a hot spot window 361 and associated with a prize, that prize can be modified according to the associated modifier(s).

In an embodiment, as described with reference to FIGS. 7A-7C, the reel strips 341-345 comprise one or more configurable symbols 355 (see FIG. 7A)—preferably, there will be at least one configurable symbol 355 on each reel strip 341-345 comprising a feature symbol 354 (e.g. in the described embodiments, the internal reel strips 342-344 will each comprise at least one configurable symbol 355). There can be different configurable symbols 355 utilized associated with different outcomes—for the purpose of this disclosure, the different configurable symbols 355 are visually distinguishable and may be associated with different prizes.

Figure 7B:
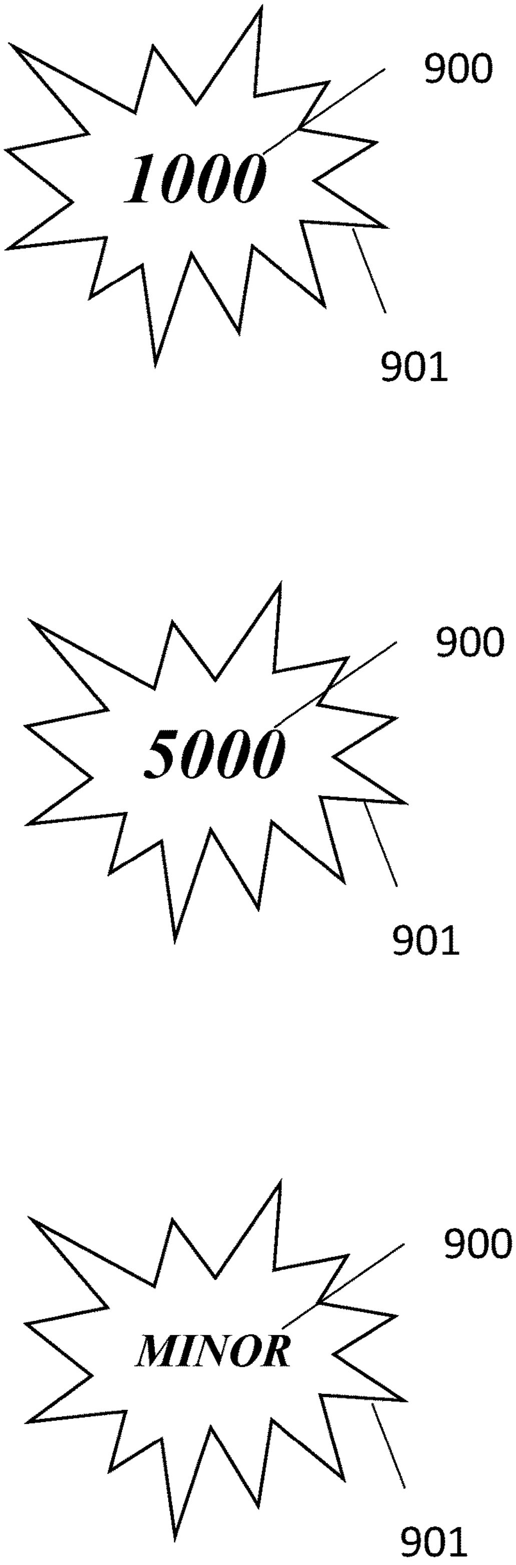

Referring to FIG. 7B, in an embodiment, the configurable symbols 355 comprise a dynamically generated visual component 900 as well as a static visual component 901—for example, the dynamic visual component 900 may have the appearance of an overlay applied to the static visual component 901 (although this is not intended to be a limiting example). In the examples shown of configurable symbols 355, the dynamic visual component 900 includes a variable prize value, and such a configurable symbol 355 may be known as a Cash-on-Reel (COR) symbol.

The variable prize value, according to this embodiment, comprises a numerical representation 900 of the prize associated with the particular configurable symbol 355. This prize may be varied between instances of gameplay, and this is represented by an updated (i.e. newly generated) appearance of the configurable symbol 355. In an example implementation, the prize associated with one or more particular configurable symbols 355 is dependent on a denomination selection made by the player. In another embodiment, which can be combined with the preceding example, the configurable symbol 355C corresponds to a game prize. Other mechanisms are possible for determining a prize. In one example, a prize is randomly determined in response to a prize trigger event—the prize may be randomly determined from within a predefined range or may be randomly selected from a plurality of predefined prizes.

Figure 7C:
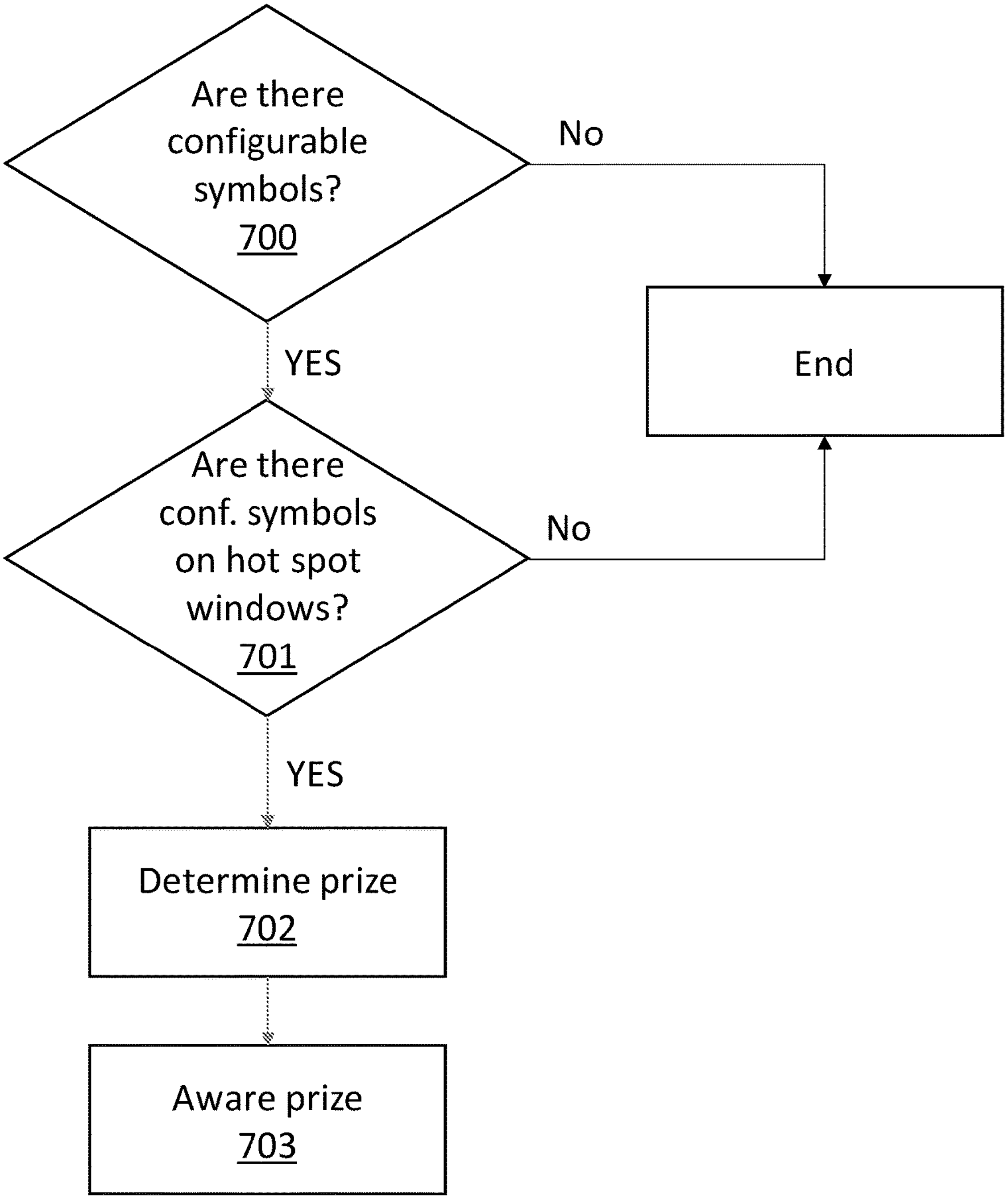

FIG. 7C shows a method for determining a prize award associated with the presence of one or more configurable symbols 355 as a result of an instance of gameplay—for example, the method is instigated as step 502 of the method of FIG. 5. It should be noted that the determination of a prize award is separate to any prize that may be awarded as a result of other game rules not included within the present method. At step 700, a check is made of the resulting arrangement of symbols 350 includes one or more configurable symbols 355—if not, the method ends.

Otherwise, at step 701, the method proceeds to check if any of those one or more configurable symbols 355 are located within a hot spot window 361—again, if not, the method ends. In practice, steps 700 and 701 may be combined into a single check.

Figure 7D:
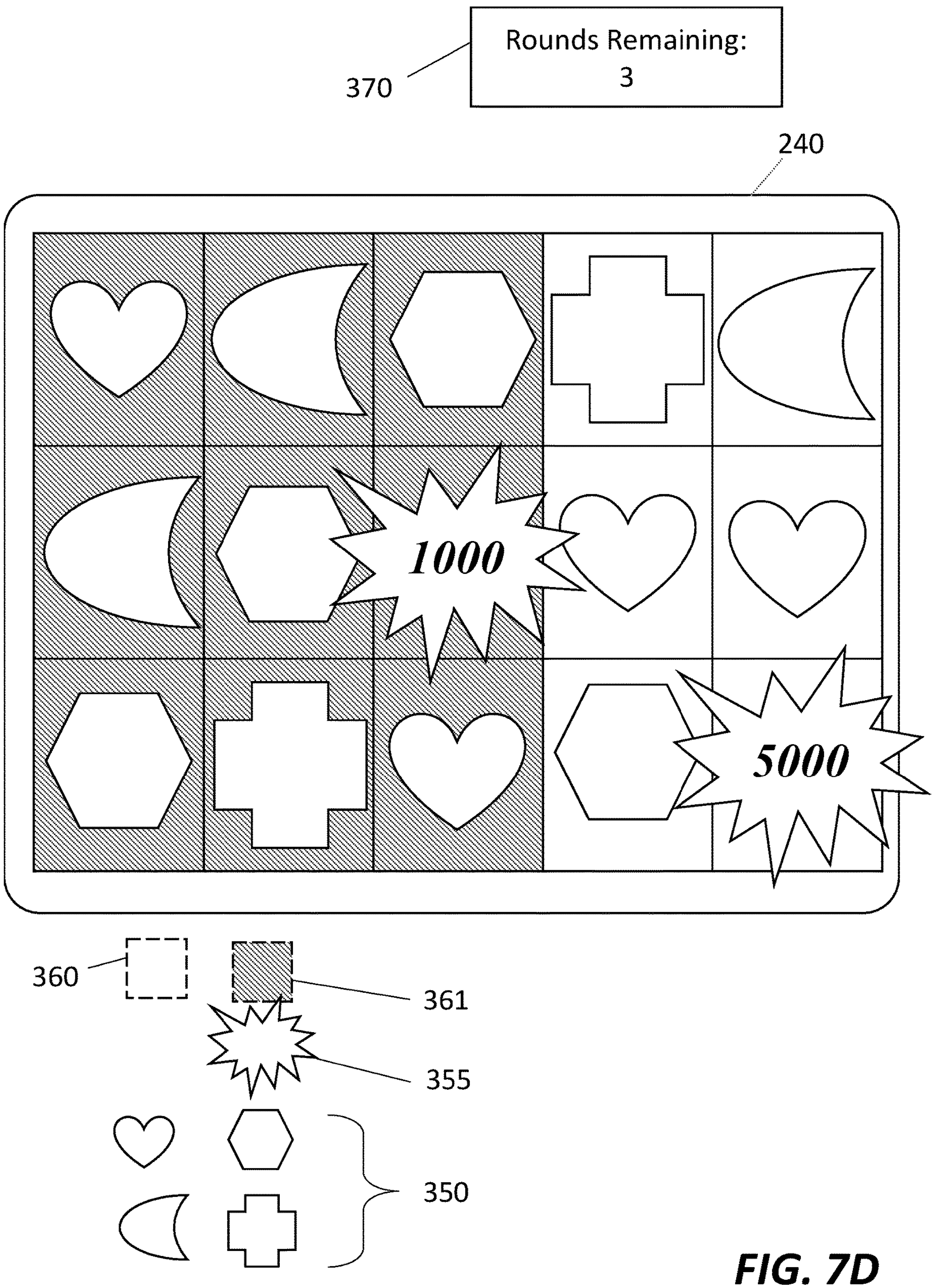

However, where at least one configurable symbol 355 is located within a hot spot window 361, the method proceeds to step 702. Here, for each configurable symbol 355 located within a hot spot window 361, a prize award is determined. FIG. 7D shows an example of a configurable symbol 355 located in a hot spot window 361. Also, in FIG. 7D is a configurable symbol 355 not present in a hot spot window 361—this configurable symbol 355 is not associated with a payout in relation to the present embodiment but may be associated with another payout due to additional game rules.

Figure 7E:
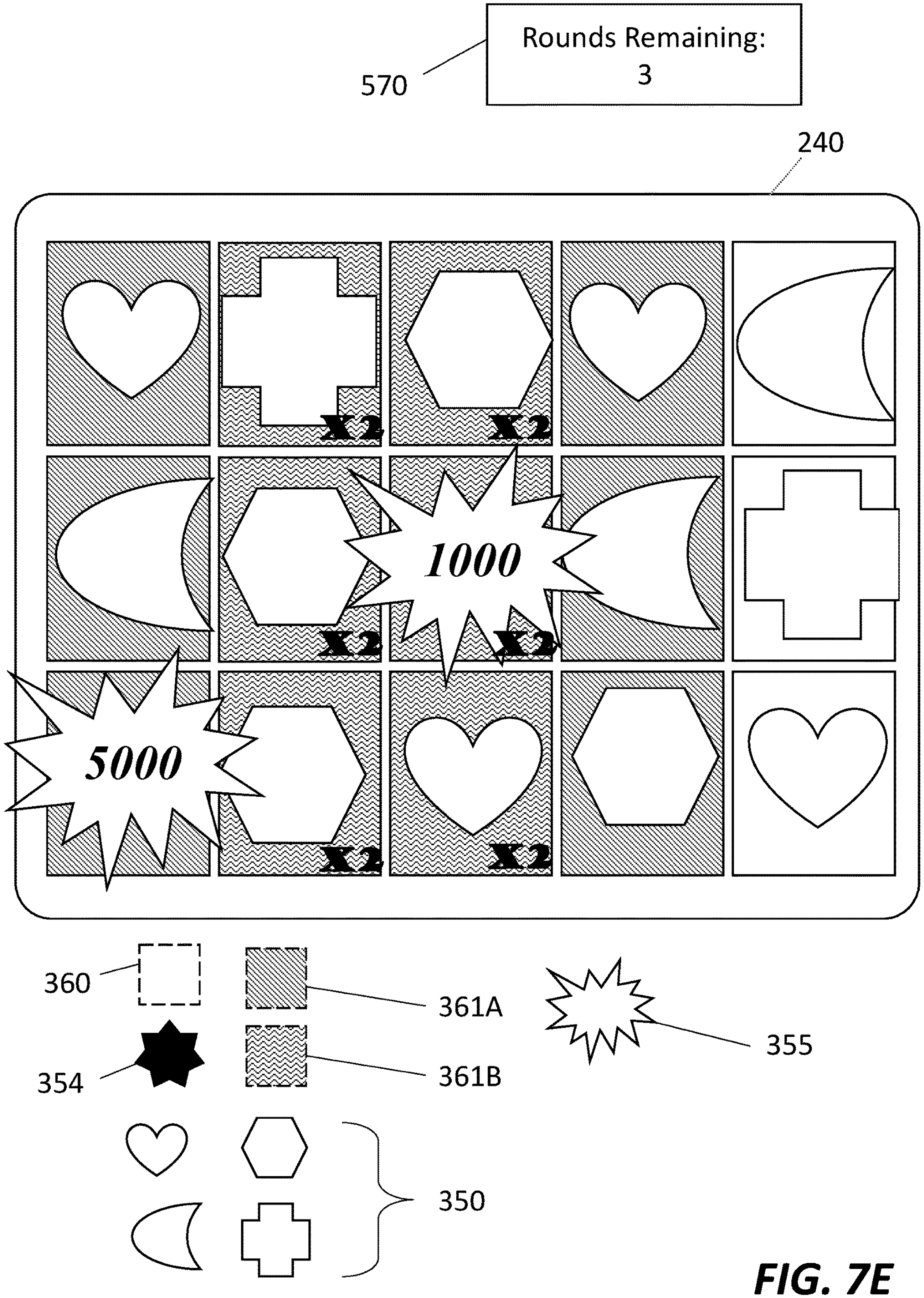

Referring to FIG. 7E, generally, the prize award is determined according to the prize as modified by the associated hot spot window 361 modifier. For example, the configurable prize may be a numerical value (e.g. "1000") and the modifier may be a multiplier (e.g. "×2")—according to this example, the prize award will be "2000" rather than "1000"). It should be understood that different options are possible for determining the prize award.

Subsequently, at step 703, the aggregate prize award (equal to the sum or other combination of each prize award) is awarded to the player (or, at the least, displayed to the player). The method then ends.

In an embodiment, the configurable symbols 355 are also associated with a bonus game (or, alternatively, one or more bonus games)—that is, a different game to a main game. In an embodiment, the main game corresponds to a reel game comprising feature symbols 354 and configurable symbols 355 as herein described. It is assumed that the bonus game is a reel game that is initiated in response to a trigger event in the primary (or main) game. In one embodiment, one or more of the reel strips 341, 342, 343, 344, 345 of the main game each comprise one or more qualifier symbols (not shown). Relevantly, when a predefined number of qualifier symbols are present as part of a game result (e.g. five qualifier symbols), then a bonus game may be triggered. In an embodiment, either or both of the feature symbols 354 and configurable symbols 355 additionally correspond to being qualifier symbols—that is, the function of the qualifier symbols 356 is additionally attributed to these symbols 354 and/or 356.

In a variation of the embodiments described, the end condition may correspond to a fixed game instance round. This may be applicable where the present embodiments are implemented as bonus games with a specific number of game instances. In this case, the end condition may be the end of the bonus game.

It will be understood that the above hot spot window implementations may be implemented in the context of a main game, e.g., a slot game that players may always be able to play (when they have sufficient credit to play), or a feature or bonus game, e.g., a game that a player may only sometimes be able to play, e.g., by being awarded one or more opportunities to play the feature or bonus game as a result of main game gameplay.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

one or more displays;

one or more processors; and one or more memories, wherein the one or more memories store computer-executable instructions that, when executed by the one or more processors:

cause the one or more processors to undertake gameplay of a game, wherein an instance of gameplay of the game comprises determining a game state defining a display of a selection of symbols, wherein each symbol is displayed in a corresponding window; and cause, for at least one instance of gameplay, the one or more processors to:

identify, for that instance of gameplay, each window in which the symbol displayed therein is a feature symbol and cause, for each window in which the symbol displayed therein is a feature symbol, one or more windows selected from a corresponding set of windows to have a corresponding modified status applied thereto according to a predefined window selection rule, wherein:

the set of windows for each window in which a feature symbol is displayed includes at least windows adjacent to that window, and each modified status that is applied to a corresponding window as a result of that instance of gameplay is associated with a corresponding number of gameplay instances remaining before that modified status transitions from being active to being expired;

decrement, for each modified status that was active for each window having one or more active modified statuses immediately prior to that instance of gameplay, the corresponding number of gameplay instances remaining before that modified status transitions from being active to being expired; and cause the one or more displays to present, for that instance of gameplay, a visual depiction of the game state, including at least one modified status for each window having one or more active modified statuses applied thereto and the corresponding number of gameplay instances remaining before that modified status transitions to being expired.

2. The gaming device of claim 1, wherein:

the windows are arranged in a pattern with one or more of the windows positioned along a first side of the pattern and another one or more of the windows positioned along a second side of the pattern opposite the first side of the pattern, and the set of windows for each window in which a feature symbol is displayed and which is positioned along one of the first side and the second side further includes one or more windows positioned along the other of the first side and the second side.

3. The gaming device of claim 1, wherein the one or more memories further store additional computer-executable instructions that, when executed by the one or more processors, further cause the one or more processors to, for the at least one instance of gameplay:

determine, in association with that instance of gameplay, whether one or more configurable symbols are associated with one or more corresponding windows having the modified status currently applied thereto; and determine, in association with that instance of gameplay and for each configurable symbol associated with a corresponding window having the modified status currently applied thereto, an outcome based on a value associated with that configurable symbol and the modified status currently applied to the window associated therewith.

4. The gaming device of claim 3, wherein:

each window displaying a configurable symbol for that instance of gameplay and having the modified status currently applied thereto has a modifier associated therewith, the modifier based on the modified status currently applied to that window, each modifier is a multiplier and the one or more memories further store additional computer-executable instructions that, when executed by the one or more processors, further cause the one or more processors to, for each outcome determined in association with a given instance of gameplay and for a given configurable symbol displayed in a window having the modified status currently applied thereto, determine that outcome by multiplying the value associated with that configurable symbol by the modifier associated with the window displaying that configurable symbol.

5. The gaming device of claim 4, wherein the multiplier for a corresponding window is based on a number of times the modified status was applied to the corresponding window since the most recent instance in which the modified status was applied to the corresponding window without the corresponding window already having the modified status.

6. The gaming device of claim 1, wherein the predefined window selection rule specifies that the set of windows for each window in which a feature symbol is displayed for a given instance of gameplay is to include one or more windows selected from the group consisting of:

a) each window horizontally adjacent to the window displaying the feature symbol, b) each window vertically adjacent to the window displaying the feature symbol, c) each window diagonally adjacent to the window displaying the feature symbol, and d) any combination of two or more of (a), (b), and (c).

7. The gaming device of claim 1, wherein the one or more memories further store additional computer-executable instructions that, when executed by the one or more processors, further cause the one or more processors to:

determine an end condition associated with the modified status applied to one or more of the windows, and cause the modified status that has been applied to the one or more of the windows to be removed therefrom when the end condition has been met.

8. A non-transitory computer-readable medium having stored thereon computer-executable instructions which, when executed by one or more processors of a gaming device having one or more displays, cause the one or more processors to:

provide gameplay for a game, wherein an instance of gameplay of the game comprises determining a game state defining a display of a selection of symbols, wherein each symbol is displayed in a corresponding window; and for at least one instance of gameplay:

identify, for that instance of gameplay, each window in which the symbol displayed therein is a feature symbol and cause, for each window in which the symbol displayed therein is a feature symbol, one or more windows selected from a corresponding set of windows to have a corresponding modified status applied thereto according to a predefined window selection rule, wherein:

the set of windows for each window in which a feature symbol is displayed includes at least windows adjacent to that window, and each modified status that is applied to a corresponding window as a result of that instance of gameplay is associated with a corresponding number of gameplay instances remaining before that modified status transitions from being active to being expired;

apply the corresponding modified status for each set of one or more windows to each window in that set of one or more windows;

decrement, for each modified status that was active for each window having one or more active modified statuses immediately prior to that instance of gameplay, the corresponding number of gameplay instances remaining before that modified status transitions from being active to being expired; and cause the one or more displays to present, for that instance of gameplay, a visual depiction of the game state, including at least one modified status for each window having one or more active modified statuses applied thereto and the corresponding number of gameplay instances remaining before that modified status transitions to being expired.

9. The non-transitory computer-readable medium of claim 8, wherein:

the windows are arranged in a pattern with one or more of the windows positioned along a first side of the pattern and another one or more of the windows positioned along a second side of the pattern opposite the first side of the pattern, and the set of windows for each window in which a feature symbol is displayed and which is positioned along one of the first side and the second side further includes one or more windows positioned along the other of the first side and the second side.

10. The non-transitory computer-readable medium of claim 8, wherein:

each window displaying a configurable symbol for that instance of gameplay and having the modified status currently applied thereto has a modifier associated therewith, the modifier based on the modified status currently applied to that window, and the computer-executable instructions further include computer-executable instructions that, when executed by the one or more processors, further cause the one or more processors to, for the at least one instance of gameplay:

determine, in association with that instance of gameplay, whether one or more configurable symbols are associated with one or more corresponding windows having the modified status currently applied thereto; and determine, in association with that instance of gameplay and for each configurable symbol associated with a corresponding window having the modified status currently applied thereto, an outcome based on a value associated with that configurable symbol and the modified status currently applied to the window associated therewith.

11. The non-transitory computer-readable medium of claim 10, wherein each modifier is a multiplier and the computer-executable instructions further include computer-executable instructions that, when executed by the one or more processors, further cause the one or more processors to, for each outcome determined in association with a given instance of gameplay and for a given configurable symbol displayed in a corresponding window having the modified status currently applied thereto, determine that outcome by multiplying the value associated with that configurable symbol by the modifier associated with the window displaying that configurable symbol.

12. The non-transitory computer-readable medium of claim 11, wherein the multiplier for a corresponding window is based on a number of times the modified status was applied to the corresponding window since the most recent instance in which the modified status was applied to the corresponding window while the corresponding window did not already have the modified status applied thereto.

13. The non-transitory computer-readable medium of claim 8, wherein the predefined window selection rule specifies that for a given window that displays a feature symbol, the modified status is to be applied to the one or more windows selected from the group consisting of:

a) each window horizontally adjacent to the given window, b) each window vertically adjacent to the given window, c) each window diagonally adjacent to the given window, and d) any combination of two or more of (a), (b), and (c).

14. The non-transitory computer-readable medium of claim 8, wherein the computer-executable instructions further include computer-executable instructions that, when executed by the one or more processors, further cause the one or more processors to:

determine, for one or more windows having a modified status being applied in association with an instance of game play, an end condition associated with the one or more windows, and cause the modified status applied to the one or more windows to be removed therefrom responsive to the end condition being met.

15. A method, executed by one or more processors, comprising:

providing, using the one or more processors, gameplay of a game, wherein an instance of gameplay of the game comprises determining a game state defining a display of a selection of symbols, wherein each symbol is displayed in a corresponding window; and for at least one instance of gameplay:

identifying, by the one or more processors and for that instance of gameplay, each window in which the symbol displayed therein is a feature symbol and cause, for each window in which the symbol displayed therein is a feature symbol, one or more windows selected from a corresponding set of windows to have a corresponding modified status applied thereto according to a predefined window selection rule, wherein:

the set of windows for each window in which a feature symbol is displayed includes at least windows adjacent to that window, and each modified status that is applied to a corresponding window as a result of that instance of gameplay is associated with a corresponding number of gameplay instances remaining before that modified status transitions from being active to being expired;

decrementing, by the one or more processors and for each modified status that was active for each window having one or more active modified statuses immediately prior to that instance of gameplay, the corresponding number of gameplay instances remaining before that modified status transitions from being active to being expired; and causing, by the one or more processors and for that instance of gameplay, a visual depiction of the game state, including at least one modified status for each window having one or more active modified statuses applied thereto and the corresponding number of gameplay instances remaining before that modified status transitions to being expired.

16. The method of claim 15, wherein:

the windows are arranged in a pattern with one or more of the windows positioned along a first side of the pattern and another one or more of the windows positioned along a second side of the pattern opposite the first side of the pattern, and the set of windows for each window in which a feature symbol is displayed and which is positioned along one of the first side and the second side further includes one or more windows positioned along the other of the first side and the second side.

17. The method of claim 16, wherein:

each window displaying a configurable symbol for that instance of gameplay and having the modified status currently applied thereto has a modifier associated therewith, the modifier based on the modified status currently applied to that window, each modifier is a multiplier, and the method further comprises, for each outcome determined in association with a given instance of gameplay and for each configurable symbol displayed in a window having the modified status currently applied thereto, multiplying a value associated with that configurable symbol by the modifier associated with the window displaying that configurable symbol to determine the outcome.

18. The method of claim 17, wherein the multiplier for a corresponding window is based on a number of times the modified status was applied to the corresponding window since the most recent instance in which the modified status was applied to the corresponding window without the corresponding window already having the modified status.

19. The method of claim 15, further comprising:

determining, by the one or more processors and in association with that instance of gameplay, whether one or more configurable symbols are displayed in one or more corresponding windows having the modified status currently applied thereto; and determining, by the one or more processors and in association with that instance of gameplay and for each configurable symbol displayed in one of the windows having the modified status currently applied thereto, an outcome based on a value associated with that configurable symbol and the modified status currently applied to the window displaying that configurable symbol.

20. The method of claim 15, further comprising:

determining, for one or more of the windows having a modified status being applied thereto, an end condition associated with that modified status, and causing that modified status to be removed from the one or more windows to which that modified status is applied responsive to the end condition being met.

* * * * *